US011180256B2

(12) United States Patent
Schultz et al.

(10) Patent No.: US 11,180,256 B2
(45) Date of Patent: Nov. 23, 2021

(54) TRANSFORMABLE SEAT ASSEMBLY

(71) Applicant: THE BOEING COMPANY, Chicago, IL (US)

(72) Inventors: John G. Schultz, Issaquah, WA (US); Haftom Y. Dessalegn, Mountlake Terrace, WA (US)

(73) Assignee: THE BOEING COMPANY, Chicago, IL (US)

( * ) Notice: Subject to any disclaimer, the term of this patent is extended or adjusted under 35 U.S.C. 154(b) by 278 days.

(21) Appl. No.: 16/223,569

(22) Filed: Dec. 18, 2018

(65) Prior Publication Data

US 2020/0189740 A1  Jun. 18, 2020

(51) Int. Cl.
*B64D 11/06* (2006.01)
*B60N 2/66* (2006.01)

(52) U.S. Cl.
CPC ............ *B64D 11/064* (2014.12); *B60N 2/663* (2015.04); *B64D 11/0643* (2014.12)

(58) Field of Classification Search
CPC ............ B64D 11/064; B64D 11/06395; B64D 11/0639; B64D 11/0643; B60N 2002/0236; B60N 2/206; B60N 2/233; B60N 2/663; B60N 2/32; A47C 7/407
See application file for complete search history.

(56) References Cited

U.S. PATENT DOCUMENTS

| | | | |
|---|---|---|---|
| 3,563,346 A | 2/1971 | Bainbridge | |
| 3,761,124 A | 9/1973 | Weik et al. | |
| 3,910,632 A | * 10/1975 | Marechal | B64D 11/0638 297/232 |
| 5,133,245 A | 7/1992 | Lee et al. | |

(Continued)

FOREIGN PATENT DOCUMENTS

| | | |
|---|---|---|
| DE | 3537203 A1 | 4/1986 |
| DE | 3842733 A1 | 6/1990 |

(Continued)

OTHER PUBLICATIONS

Communication Pursuant to Rule 62 EPC for EP Application No. 21166259.8 dated Apr. 30, 2021.

(Continued)

*Primary Examiner* — Milton Nelson, Jr.
(74) *Attorney, Agent, or Firm* — Marshall, Gerstein & Borun LLP

(57) ABSTRACT

Transformable seat assembly includes a seat support structure and back support structure connected with an axis of rotation. Actuator assembly includes a cylinder and a piston positioned within the cylinder. The cylinder is secured to one of the back support structure or the seat support structure and the piston is secured to other of the one of the back support structure or the seat support structure. With blocking member in a first position, the piston is permitted to travel between the blocking member and an end of the cylinder spaced apart from the blocking member, such that with the piston traveling to the end of the cylinder, rotation of back support structure is limited from rotating beyond a first reclined position and with blocking member in a second position, back support structure is permitted to rotate into an overlying position relative to the seat support structure.

20 Claims, 20 Drawing Sheets

(56) References Cited

U.S. PATENT DOCUMENTS

| | | | |
|---|---|---|---|
| 5,169,209 A * | 12/1992 | Beroth | B64D 11/06 |
| | | | 297/146 |
| 5,299,853 A | 4/1994 | Griswold et al. | |
| 5,335,965 A * | 8/1994 | Sessini | A47C 7/425 |
| | | | 297/284.4 |
| 5,393,123 A | 2/1995 | Hernandez et al. | |
| 5,522,639 A | 6/1996 | Jaime | |
| 5,611,503 A | 3/1997 | Brauer | |
| 5,690,384 A | 11/1997 | Rossi | |
| 5,740,989 A | 4/1998 | Daines | |
| 5,758,924 A | 6/1998 | Vishey | |
| 5,779,312 A | 7/1998 | Nagai et al. | |
| 5,816,650 A | 10/1998 | Lucas, Jr. | |
| 5,871,259 A | 2/1999 | Gehart | |
| 6,079,773 A | 6/2000 | Hassan | |
| 6,082,815 A | 7/2000 | Xiromeritis et al. | |
| 6,322,146 B1 | 11/2001 | Fisher, Jr. | |
| 6,419,313 B1 | 7/2002 | Newman | |
| 6,663,174 B2 | 12/2003 | Drage et al. | |
| 6,817,646 B2 | 11/2004 | Kikuchi et al. | |
| 6,869,121 B2 | 3/2005 | Kayumi et al. | |
| 6,877,807 B2 | 4/2005 | Mizuno et al. | |
| 8,714,619 B2 | 5/2014 | Lindley et al. | |
| 8,888,189 B2 | 11/2014 | Tamura et al. | |
| 8,936,214 B2 | 1/2015 | Foucher et al. | |
| 8,991,914 B2 | 3/2015 | Grovender | |
| 9,650,145 B2 | 5/2017 | Lambert | |
| 9,764,663 B2 | 9/2017 | Lee | |
| 10,336,262 B2 | 7/2019 | Mozurkewich et al. | |
| 10,688,894 B2 | 6/2020 | Nevarez et al. | |
| 2002/0043857 A1 | 4/2002 | Glance | |
| 2003/0057910 A1 | 3/2003 | Nivet | |
| 2004/0051003 A1 | 3/2004 | Cheung | |
| 2005/0088021 A1 | 4/2005 | Knaust et al. | |
| 2006/0100914 A1 | 5/2006 | Jafri et al. | |
| 2008/0033771 A1 | 2/2008 | Barry | |
| 2008/0315637 A1 | 12/2008 | Ghisoni et al. | |
| 2009/0243358 A1 | 10/2009 | Henshaw | |
| 2010/0194133 A1 | 8/2010 | Nakamura et al. | |
| 2011/0241402 A1 | 10/2011 | Bruck et al. | |
| 2013/0054279 A1 | 2/2013 | Sharp et al. | |
| 2014/0062157 A1 | 3/2014 | Bruck | |
| 2014/0132040 A1 | 5/2014 | Arakawa et al. | |
| 2015/0199618 A1 | 7/2015 | Khan | |
| 2015/0242888 A1 | 8/2015 | Zises | |
| 2016/0023574 A1 | 1/2016 | Cheng | |
| 2016/0227931 A1 | 8/2016 | Ledat | |
| 2020/0039393 A1 * | 2/2020 | Lindsay | B60N 2/2227 |
| 2020/0139861 A1 | 5/2020 | Nevarez et al. | |
| 2020/0189742 A1 | 6/2020 | Dessalegn et al. | |

FOREIGN PATENT DOCUMENTS

| | | | | |
|---|---|---|---|---|
| DE | 19952339 A1 | | 5/2000 | |
| DE | 10112017 A1 | | 9/2002 | |
| DE | 10143807 A1 | | 3/2003 | |
| EP | 2103479 A2 | | 9/2009 | |
| FR | 2345111 A1 | * | 10/1977 | B60N 2/66 |
| GB | 956606 A | | 4/1964 | |
| GB | 1301859 A | | 1/1973 | |
| JP | 11009374 A | | 1/1999 | |
| WO | WO-2012006941 A | * | 1/2012 | B60N 2/3031 |
| WO | WO-2019089075 A1 | | 5/2019 | |

OTHER PUBLICATIONS

Extended European Search Report for EP Application No. 19206518.3 dated May 7, 2020.
Non-Final Office Action for U.S. Appl. No. 16/223,588 dated Nov. 20, 2020.
Final Office Action for U.S. Appl. No. 16/223,588 dated Sep. 8, 2020.
Non-Final Office Action for U.S. Appl. No. 16/223,588 dated May 21, 2020.
Non-Final Office Action for U.S. Appl. No. 16/223,605 dated Dec. 18, 2020.
Final Office Action for U.S. Appl. No. 16/223,605 dated Mar. 29, 2021.
Notice of Allowance for U.S. Appl. No. 16/223,588 dated Apr. 20, 2021.
Non-Final Office Action for U.S. Appl. No. 16/223,531 dated Apr. 15, 2020.

* cited by examiner

TRANSFORMABLE SEAT ASSEMBLY

FIELD

This disclosure relates to seats and more particularly to adjusting of a configuration of a seat in relationship to a seat positioned adjacent to the seat.

BACKGROUND

Seat occupant comfort is a priority in areas which provide organized seating arrangements. Organized seating, for example provides a seat wherein another seat is positioned in front of the seat and yet another seat is positioned behind the seat. Such organized seating arrangements can be found in, for example, transportation vehicles such as trains, buses or airplanes, as well as, for example, in auditoriums and theaters. As the organized seating becomes occupied, non-occupied adjacent seats can result in being positioned in front of and/or behind a seat which is occupied. It would be beneficial to provide an occupant of a seat, which has an adjacent non-occupied seat, positioned in front of and/or behind the occupied seat, the ability to optimize use of potential usable space provided by the non-occupied adjacent seat so as to provide additional comfort opportunities for the occupant.

SUMMARY

An example includes a transformable seat assembly which includes a seat support structure and a back support structure connected to the seat support structure with a hinge which defines an axis of rotation. An actuator assembly which includes a cylinder and a piston positioned within the cylinder. The cylinder is secured to one of the back support structure or the seat support structure. The piston is secured to other of the one of the back support structure or the seat support structure. A blocking member is positioned within and adjustable along the cylinder. With the blocking member in a first position, the piston having a piston head is permitted to travel between abutting the blocking member in a first limit position limiting linear travel of the piston in a first direction and an end of the cylinder spaced apart in an opposing second direction from the blocking member, such that with the piston head traveling to the end of the cylinder, rotational travel of the back support structure about the axis of rotation is limited from rotating the back support structure beyond a first reclined position. With the blocking member in a second position, the blocking member permits linear travel of the piston in the first direction beyond the first limit position such that rotational travel of the back support structure rotates about the axis of rotation into an overlying position relative to the seat support structure.

An example includes a method for transforming a transformable seat assembly which includes a step of moving a blocking member from a first position to a second position with the blocking member positioned within a cylinder of an actuator assembly with the actuator assembly including a cylinder and a piston having a piston head positioned within the cylinder. The transformable seat assembly includes a seat support structure connected to a back support structure with a hinge, which defines an axis of rotation. The cylinder is secured to one of the back support structure or the seat support structure and the piston is secured to other of the one of the back support structure or the seat support structure. With the blocking member in the first position, the piston head is permitted to travel between, abutting the blocking member in a first limit position limiting linear travel of the piston in a first direction and an end of the cylinder positioned spaced apart in an opposing second direction from the blocking member, such that with the piston traveling to the end of the cylinder, rotational travel of the back support about the axis of rotation is limited from rotating the back support structure beyond a first reclined position. The method further includes a step of rotating the back support structure about the axis of rotation into an overlying position relative to the seat support structure with the blocking member in the second position permitting linear travel of the piston in the first direction beyond the first limit position.

The features, functions, and advantages that have been discussed can be achieved independently in various embodiments or may be combined in yet other embodiments further details of which can be seen with reference to the following description and drawings.

DESCRIPTION

Figure 1:
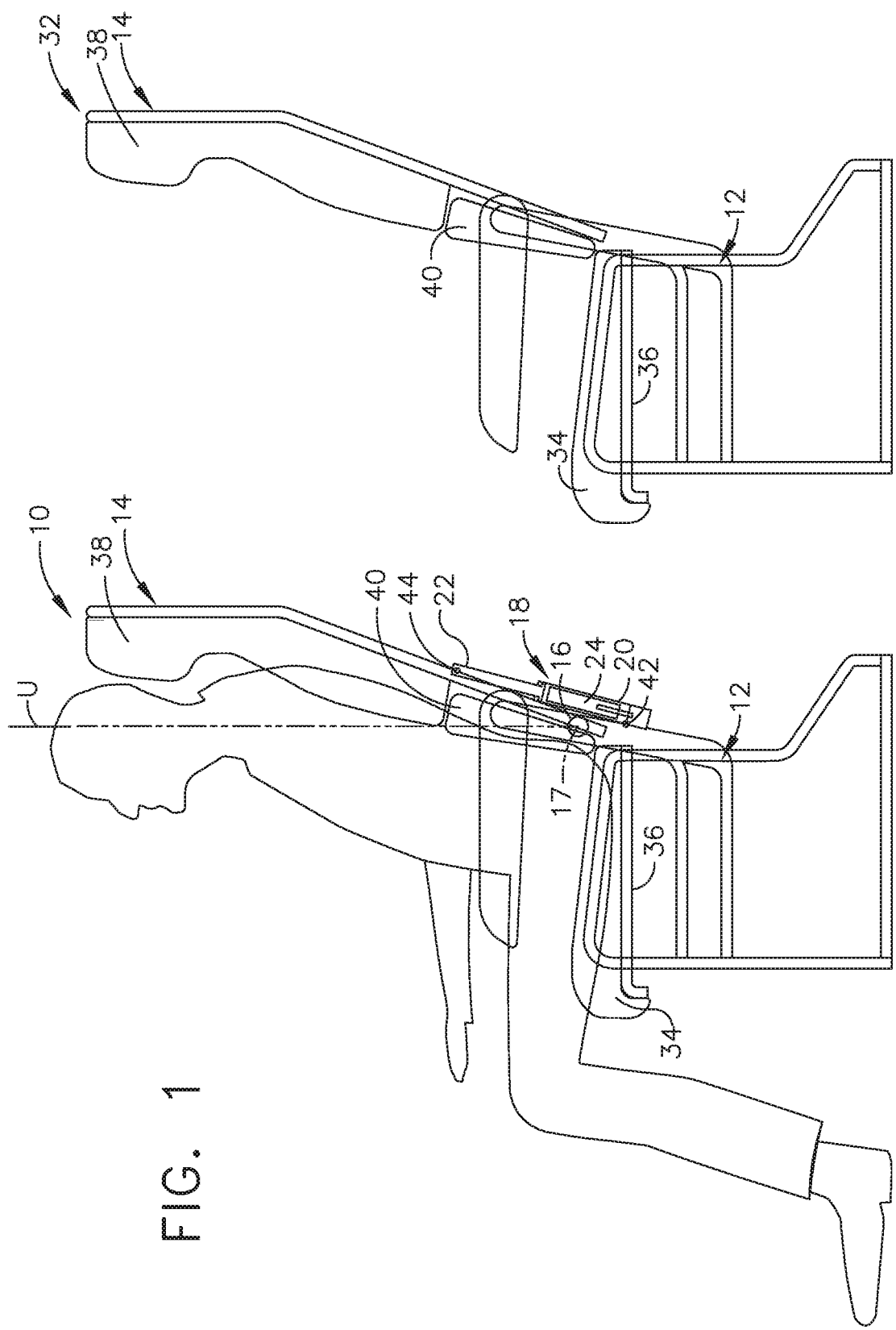
FIG. 1 is a side elevation schematic view of a first example of a transformable seat assembly which is occupied and positioned in an upright position with an unoccupied seat assembly positioned adjacent to and behind the occupied transformable seat assembly.
Figure 2:
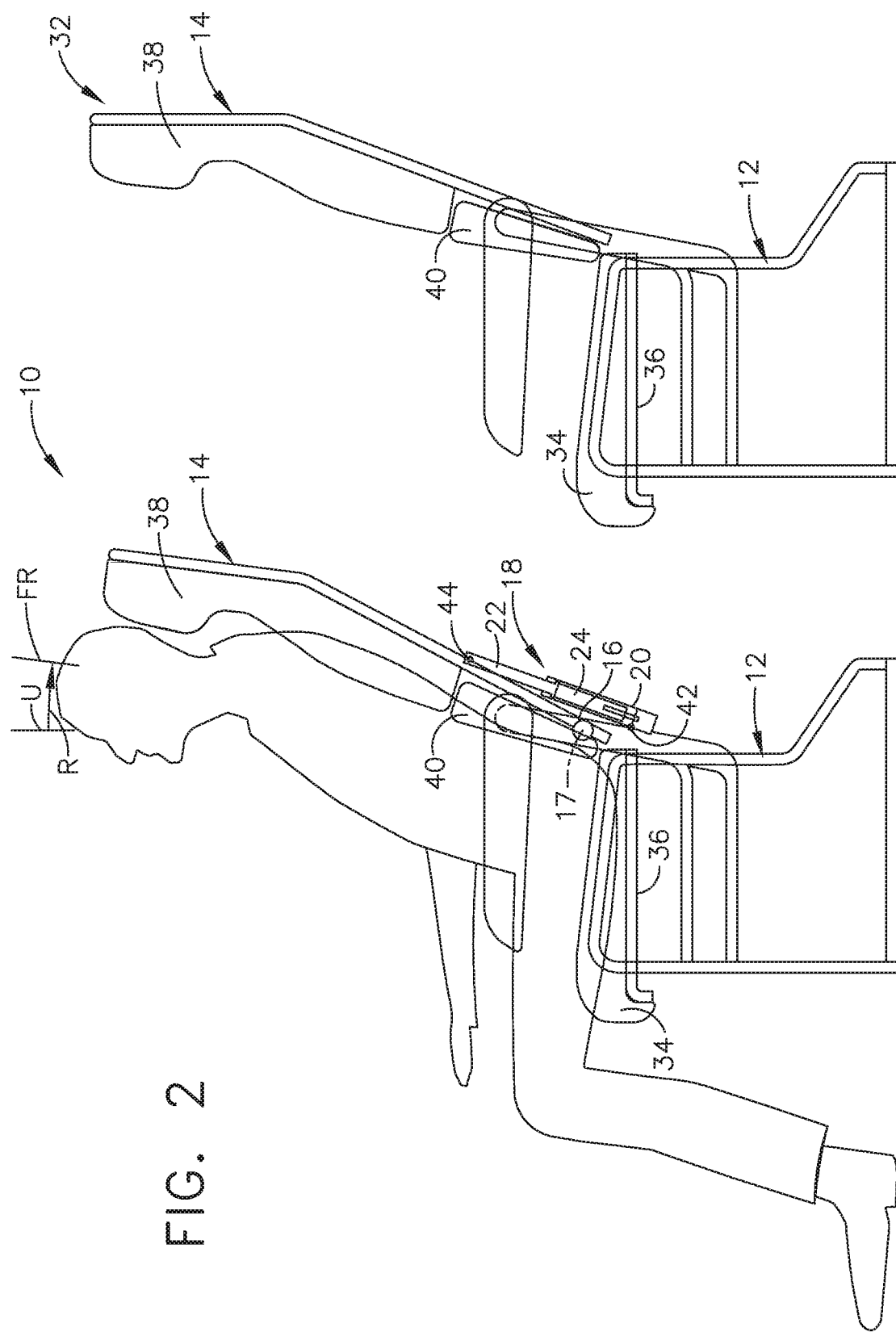
FIG. 2 is the view of the transformable seat assembly of FIG. 1 with the first example of the occupied transformable seat assembly in a first reclined position.
Figure 3:
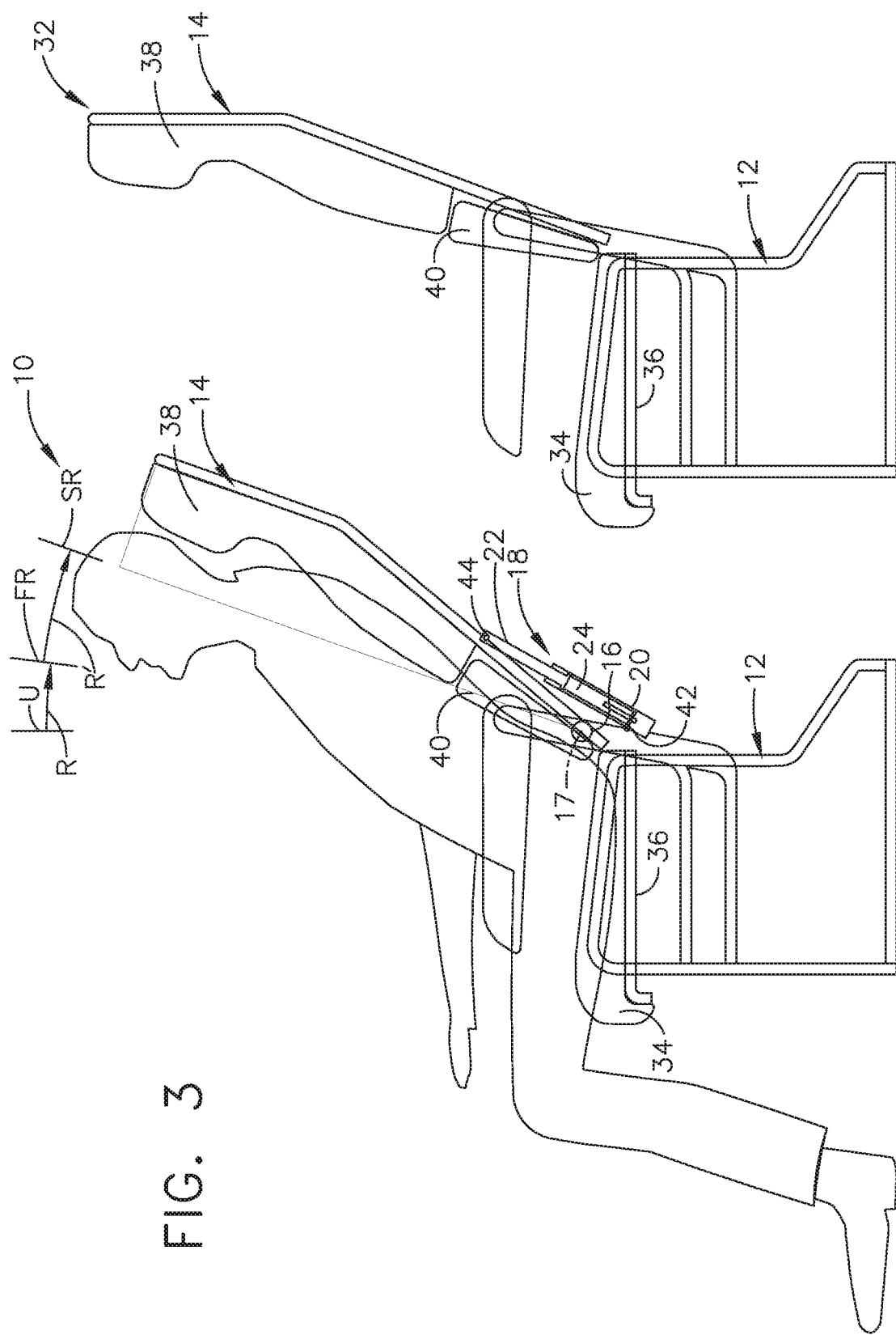
FIG. 3 is the view of the transformable seat assembly of FIG. 1 with the first example of the occupied transformable seat assembly in a second reclined position beyond the first reclined position of FIG. 2.
Figure 4:
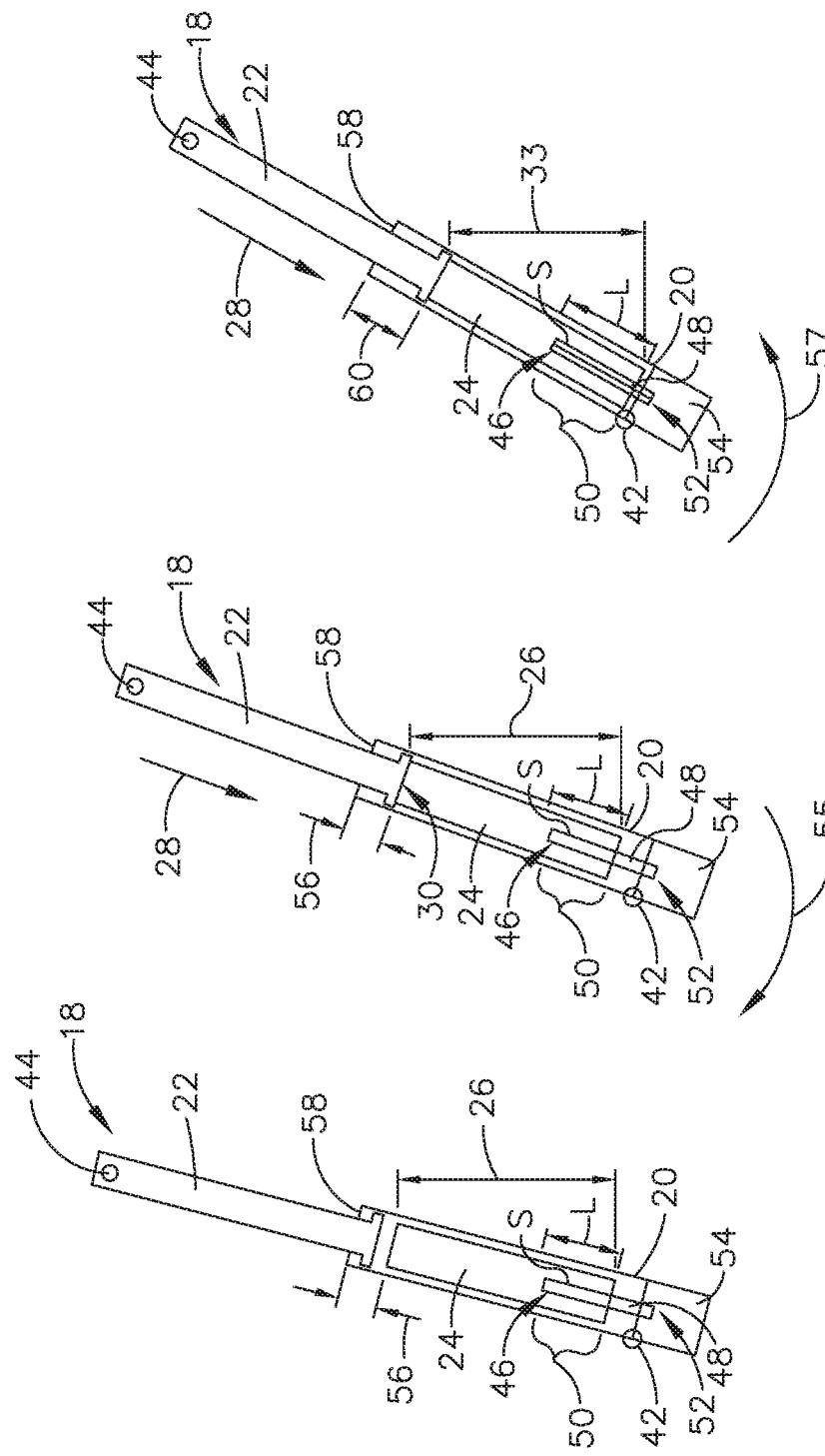
FIG. 4A is an enlarged view of the actuator assembly of FIG. 1.
FIG. 4B is an enlarged view of the actuator assembly of FIG. 2.
FIG. 4C is an enlarged view of the actuator assembly of FIG. 3.

In referring to FIGS. 1-3, first example of transformable seat assembly 10 includes seat support structure 12 and back support structure 14. Back support structure 14 is connected to seat support structure 12 with hinge 16, which defines an axis of rotation 17. Seat support structure 12 can be constructed of one or more parts which provide support for an occupant of transformable seat assembly 10. Similarly, back support structure 14 can be constructed of one or more parts which provide back support to an occupant of transformable seat assembly 10. Actuator assembly 18 includes cylinder 20 and piston 22 with piston 22 positioned within cylinder 20, as seen schematically in FIGS. 4A-4C, which correspond to actuator assembly 18 as positioned with respect to transformable seat 10 as seen in FIGS. 1-3, respectively. Cylinder 20 is secured to one of back support structure 14 or seat support structure 12. In this example cylinder 20 is secured to seat support structure 12. Piston 22 is secured to the other of the one of back support structure 14 or seat support structure 12. In this example, piston 22 is secured to back support structure 14. Back support structure 14 is shown schematically in FIG. 1 in an upright position U.

Blocking member 24 is positioned within and adjustable along cylinder 20. Blocking member 24, as seen in FIGS. 1 and 2 and as shown in FIGS. 4A and 4B respectively, is shown in first position 26, wherein first position 26 is the same position for transformable seat assembly 10 in FIGS. 4A and 4B. In FIG. 1, in this example, back support structure 14 is positioned in upright position U. This upright position U corresponds in this example with piston 22, as seen in FIG. 4A, positioned at end 58 of cylinder 20. Back support structure 14, for example, is locked in position with traditional locking and unlocking engagements for a seat assembly, which can be found, for example, in use such as within an aircraft passenger seat. The occupant can sit down on transformable seat assembly 10 and the occupant can choose to recline back support structure 14 or not to do so. The occupant at that time can push an actuator button, not shown, which can unlock a locking securement of back support structure 14 and allow occupant to rotate back support structure 14 in direction R as shown in FIG. 2 to first reclined position FR, which can be limited, in some examples, to several inches so as not to overly intrude into space occupied by any occupant of second seat assembly 32 positioned behind and adjacent to transformable seat assembly 10. First reclined position FR for back support structure 14 is attained, as seen in FIGS. 2 and 4B, with piston 22 traveling within cylinder 20 in first direction 28 to first limit position 30 of piston 22 with piston 22 coming into abutting relationship with blocking member 24. In piston 22 traveling in first direction 28 to abut blocking member 24, rotational travel of back support structure 14 about axis of rotation 17 is permitted in direction R and back support structure 14 is limited from rotating beyond first reclined position FR with piston 22 coming into abutting relationship with blocking member 24.

In some examples, a displacement of back support structure 14 may be only a few inches, as mentioned above, dependent on the proximity of second seat assembly 32 positioned, in this example, behind and adjacent to transformable seat assembly 10. However, should second seat assembly 32 be unoccupied, the rotational displacement of back support structure 14 can be permitted to allow an occupant of transformable seat assembly 10 to occupy additional space associated with second seat assembly 32. This can allow the occupant of transformable seat assembly 10 the opportunity to optimize their comfort with respect to transformable seat assembly 10. As seen in FIG. 3, with second seat assembly 32 unoccupied and with blocking member 24 in second position 33, as seen in FIG. 4C, wherein blocking member 24 is now positioned further down or recessed within cylinder 20, blocking member 24 permits linear travel of piston 22 in first direction 28 beyond first limit position 30 of piston 22, of FIG. 4B, such that rotational travel in direction R' of back support structure 14, as seen in FIG. 3, can take place rotating back support structure 14, about axis of rotation 17, beyond first reclined position FR to second reclined position SR. Second reclined position SR is greater in rotational displacement from upright position U than first reclined position FR and provides occupant an opportunity to use unoccupied space associated with second seat assembly 32.

In this example, transformable seat assembly 10 further includes seat cushion 34 positioned overlying seat support frame 36 of seat support structure 12 as seen in FIGS. 1-3. Transformable seat assembly 10 further includes back cushion 38 and lumbar cushion 40 each positioned overlying back support structure 14. The configuration of transformable seat assembly 10 with respect to the cushions and seat and back support structures are known components to transformable seat assembly 10, wherein seat support structure 12 is a frame assembly, as mentioned earlier being constructed of one or more parts, which provides support to the occupant with the occupant sitting on seat cushion 34 and back support structure 14 is a support structure, as mentioned earlier being constructed of one or more parts, which provides support to the occupant's back while occupant is sitting in transformable seat assembly 10. In this example, back support structure 14 provides support for back cushion 38 and lumbar cushion 40 providing additional comfort for occupant's back while occupant resides in transformable seat assembly 10.

Cylinder 20 of actuator assembly 18 is pivotally secured with pivot connector 42 to one of back support structure 14 or seat support structure 12 and in this example, as shown in FIG. 1, pivot connector 42 connects cylinder 20 to seat support structure 12. Piston 22 is pivotally secured with pivot connector 44 to one of back support structure 14 or seat support structure 12 and in this example, as shown in FIG. 1, pivot connector 44 connects piston 22 to back support structure 14. Pivot connector 42 provides for cylinder 20 to rotate relative to seat support structure 12 with back support structure 14 rotating about axis of rotation 17 and similarly pivot connector 44 provides for piston 22 to rotate relative to back support structure 14 with back support structure 14 rotating about axis of rotation 17.

In referring to FIGS. 4A-4C, blocking member 24 positioned within cylinder 20 further includes opening 46 defined by blocking member 24 which extends within and along length L of blocking member 24. A plurality of threads (not shown) defined by blocking member 24 are positioned along surface S of opening 46 within blocking member 24. Threaded shaft 48 is associated with opening 46 defined by blocking member 24, wherein threaded shaft 48 defines a plurality of threads (not shown) compatible with the plurality of threads (not shown) defined by blocking member 24.

The plurality of threads (not shown) of a first end portion 50 of threaded shaft 48 engage the plurality of threads (not shown) defined by blocking member 24. Second end portion 52 of threaded shaft 48 is connected to motor 54 which imparts rotation to threaded shaft 48 which results in linear movement of blocking member 24 along cylinder 20. With rotation of threaded shaft 48 by motor 54 in first rotational direction 55, for example as seen in FIG. 4B, blocking member 24 moves from first position 26 toward second position 33, as seen in FIG. 4C. With rotation of threaded shaft 48 by motor 54 in second rotational direction 57, for example as seen in FIG. 4C, blocking member 24 moves from second position 33 toward first position 26, as seen in FIGS. 4A and B.

As seen for example in FIGS. 1 and 2 and in FIGS. 4A and 4B respectively, blocking member 24 is in first position 26. With blocking member 24 in first position 26, back support structure 14 of transformable seat assembly 10 is permitted to rotate about axis of rotation 17 between upright position U and first reclined position FR. With blocking member 24 moved to second position 33, as seen in FIG. 4C, wherein blocking member 24 is positioned in a lower position, in this example, within cylinder 20 than blocking member 24 was in first position 26, as seen in FIGS. 4A and 4B, back support structure 14 of transformable seat assembly 10 is permitted to operate between upright position U and second reclined position SR. Second reclined position SR is a position for the occupant to be closer to a prone position than first reclined position FR. Occupant having an opportunity to attain second reclined position SR provides the occupant an opportunity to optimize use of usable space provided by unoccupied second seat assembly 32 and at the same time optimize the occupant's comfort.

In referring to FIGS. 4A and 4B, first position 26 of blocking member 24 being first distance 56 from end 58 of cylinder 20 such that with piston positioned at end 58 of cylinder 20, as mentioned earlier, back support structure 14 is in upright position U. With blocking member 24 in second position 33 as seen in FIG. 4C, blocking member 24 is second distance 60 from end 58 of cylinder 20. Second distance 60 from end 58 is greater in this example than first distance 56. Blocking member 24 being positioned further from end 58 permits piston 22 to travel further within cylinder 20 resulting in back support structure 14 attaining second reclined position SR providing the occupant of transformable seat assembly 10 an opportunity to recline further and attain more comfort.

Figure 5:
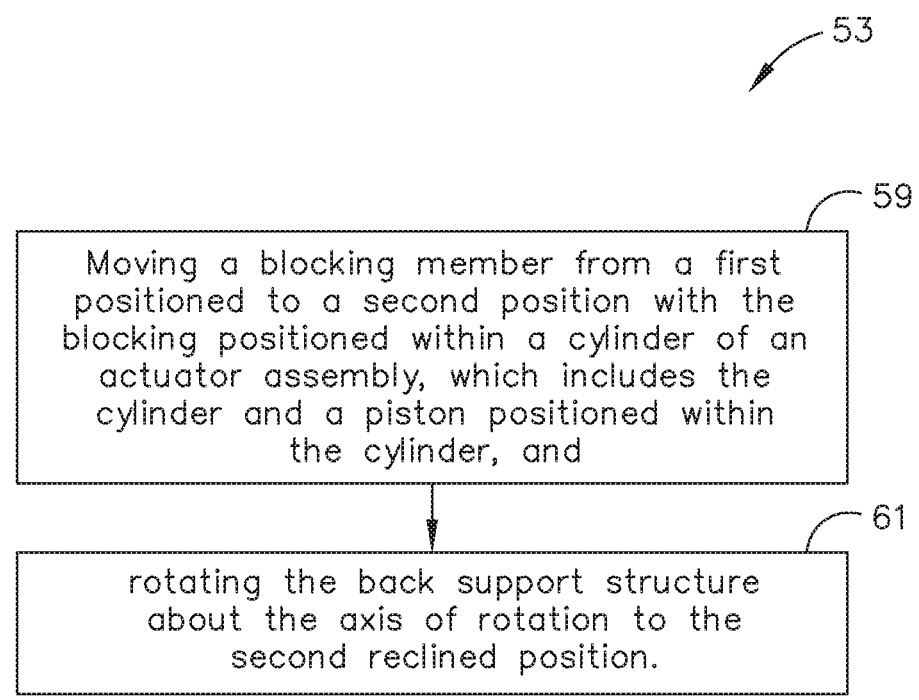
FIG. 5 is a flow chart of a method for transforming the first example of the transformable seat assembly of FIG. 1.

In referring to FIG. 5, method 53 of transforming a transformable seat assembly 10 includes step 59 of moving blocking member 24 from a first position to a second position with the blocking member 24 positioned within cylinder 20 of actuator assembly 18, which includes cylinder 20 and piston 22 positioned within cylinder 20. As seen in FIGS. 1-4C, transformable seat assembly 10 includes seat support structure 12 connected to back support structure 14 with hinge 16, which defines an axis of rotation 17. Cylinder 20 is secured to one of back support structure 14 or seat support structure 12 and piston 22 is secured to the other of the one of back support structure 14 or the seat support structure 12. With blocking member 24 in first position 26, blocking member 24 limits linear travel of piston 22 in first direction 28 to first limit position 30 of piston 22 such that rotational travel of the back support structure 14 about axis of rotation 17 is limited from rotating back support structure 14 beyond first reclined position FR. With blocking member 24 in second position 33, blocking member 24 permits linear travel of piston 22 in first direction 28 beyond first limit position 30 of piston 22 such that rotational travel of back support structure 14 about axis of rotation 17 is permitted beyond first reclined position FR to second reclined position SR. Method 53 further includes step 61 of rotating back support structure 14 about axis of rotation 17 to the second reclined position SR.

As mentioned earlier, transformable seat assembly 10 further includes seat cushion 34 positioned in overlying relationship to seat support structure 12 and includes back cushion 38 and lumbar cushion 40 positioned in overlying relationship to back support structure 14. In addition, cylinder 20 is pivotally secured to one of back support structure 14 or seat support structure 12 and piston 22 is pivotally secured to the other of the one of the back support structure 14 or the seat support structure 12. With rotating back support structure 14 about axis of rotation 17 the pivotal securement permits cylinder 20 to pivotally rotate relative to the one of the back support structure 14 or the seat support structure 12 and permits piston 22 to pivotally rotate relative to the other of the one of the back support structure 14 or the seat support structure 12.

Step 59 of moving the blocking member 24 positioned within the cylinder 20 further includes activating motor 54 to rotate threaded shaft 48, as seen in FIGS. 4A-4C. Blocking member 24 defines opening 46, which extends within and along length L of blocking member 24. Plurality of threads (not shown) defined by blocking member 24 are positioned along surface S of opening 46 within blocking member 24. Threaded shaft 48, associated with the opening 46 defined by blocking member 24, defines plurality of threads (not shown) compatible with the plurality of threads (not shown) defined by blocking member 24. Plurality of threads (not shown) of first end portion 50 of threaded shaft 48 engages the plurality of threads (not shown) defined by blocking member 24 and second end portion 52 of threaded shaft 48 is connected to motor 54. Rotation of threaded shaft 48 imparts linear movement of blocking member 24 along cylinder 20. With rotating threaded shaft 48 in a first rotational direction 55, for example as seen in FIG. 4B, blocking member 24 moves from first position 26 to second position 33, as seen in FIG. 4C. With blocking member 24 in second position 33, as seen in FIG. 4C, and with rotating threaded shaft in second rotational direction 57, for example as seen in FIG. 4C, results in moving blocking member 24 from second position 33 to first position 26 of either FIG. 4A or 4B.

Figure 6:
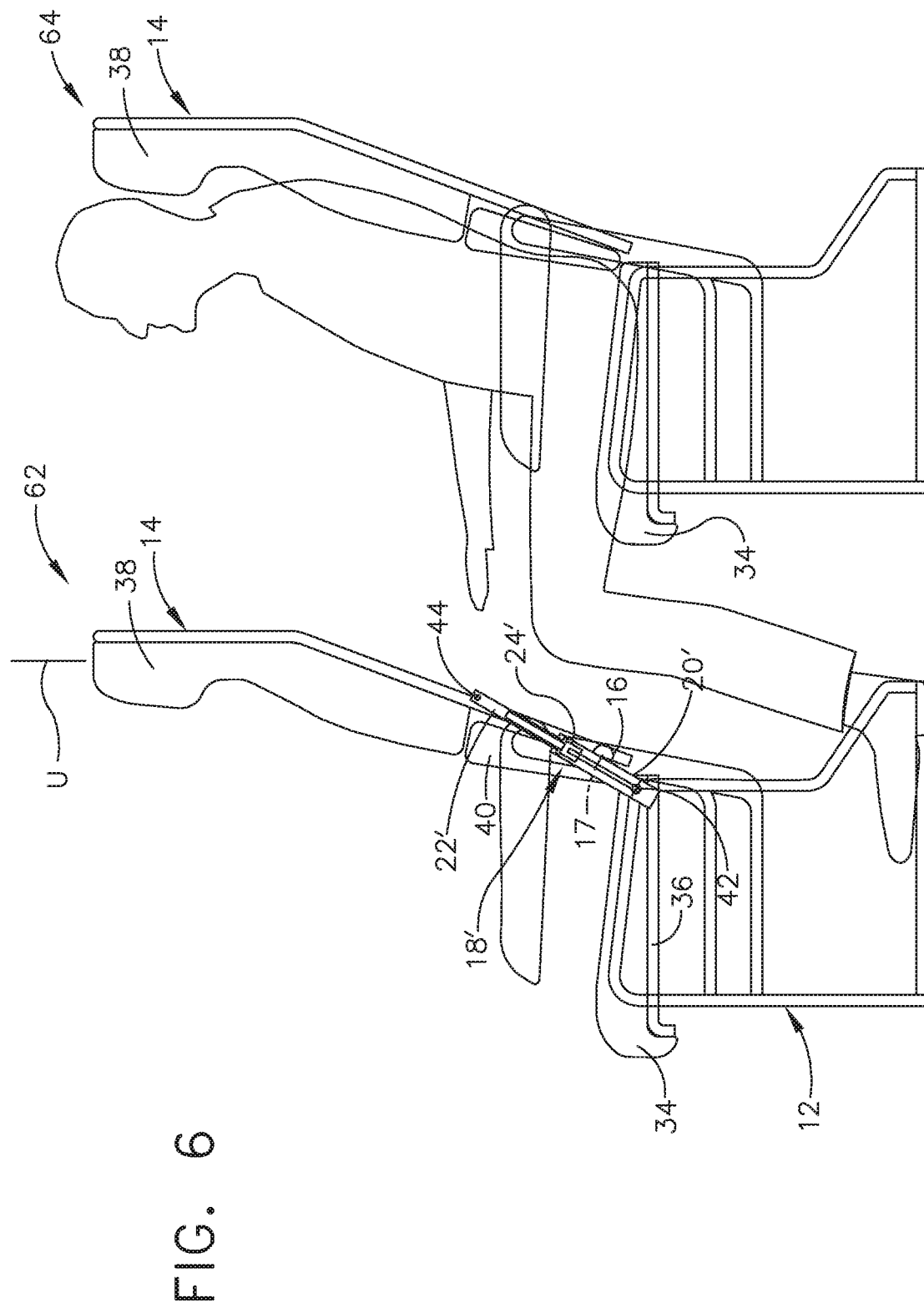
FIG. 6 is a side elevation schematic view of a second example of a transformable seat assembly which is unoccupied and is positioned in an upright position with an occupied seat assembly positioned behind and adjacent to the second example of the transformable seat assembly.
Figure 7:
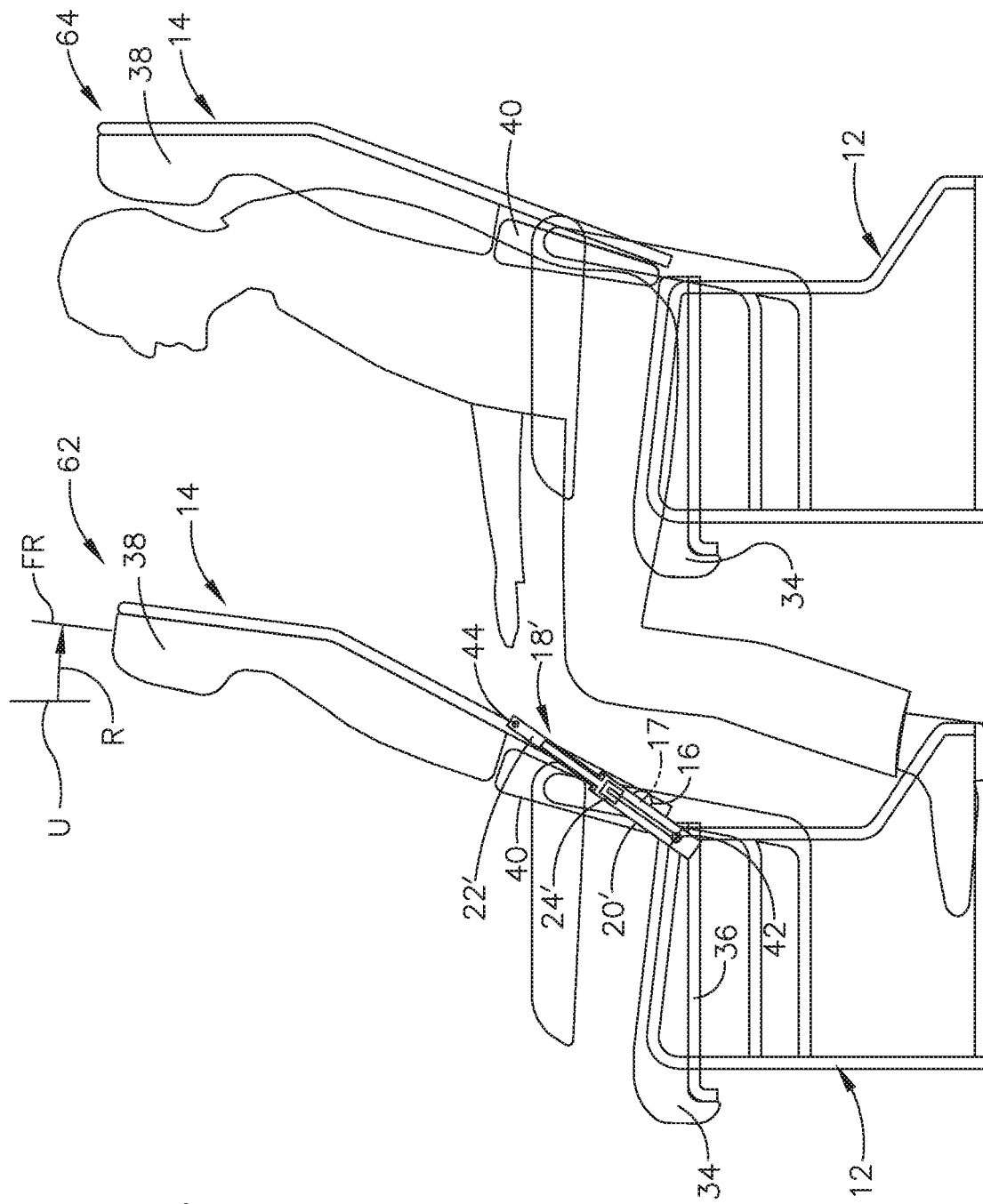
FIG. 7 is the view of the second example of the transformable seat assembly of FIG. 6 with the transformable seat assembly in a first reclined position.
Figure 8:
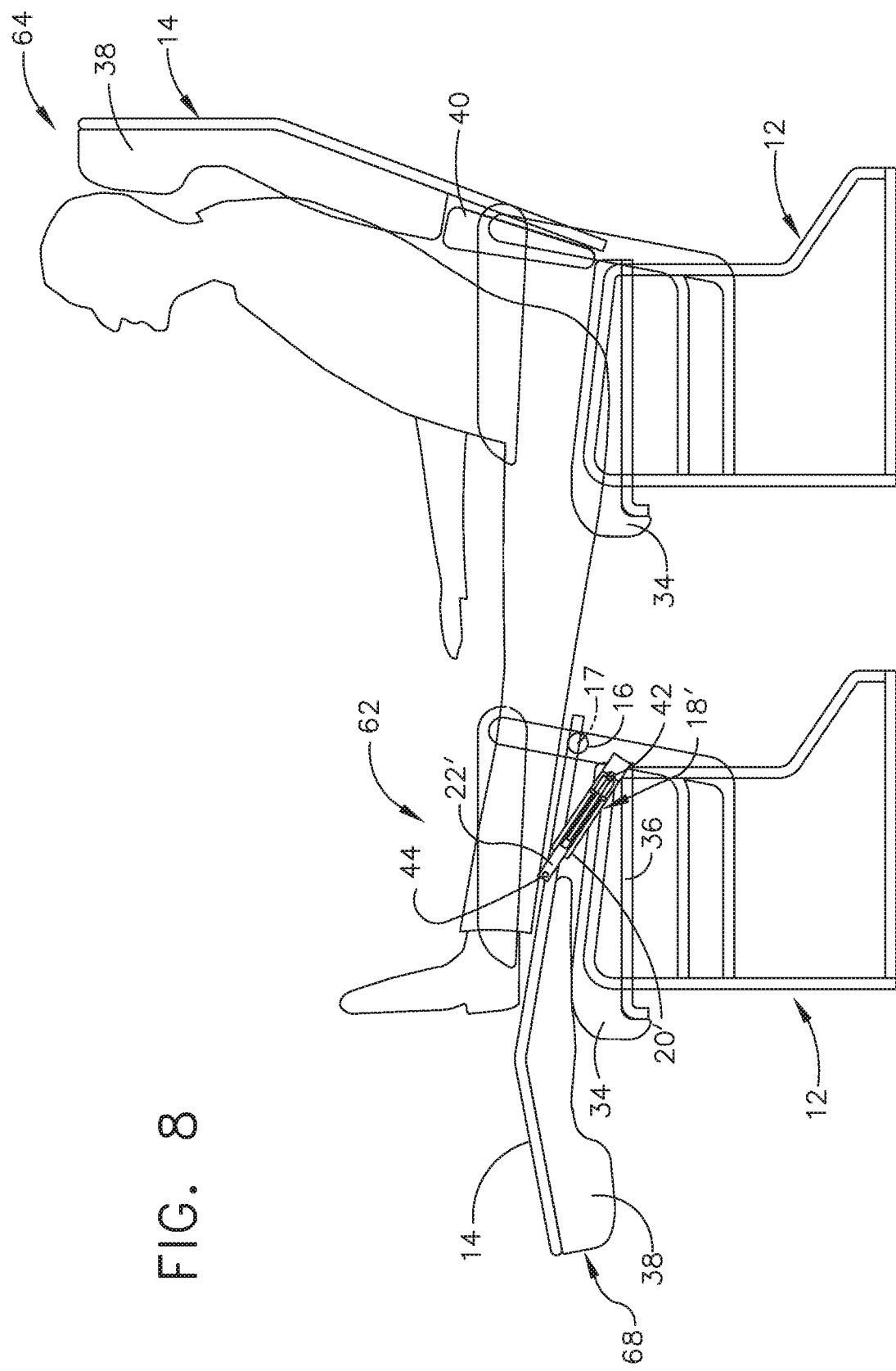
FIG. 8 is the view of the second example of the transformable seat assembly of FIG. 6 with a back support structure rotated forward providing extended leg room for the occupant of the occupied seat assembly positioned behind and adjacent to the second example of the transformable seat assembly.

In referring to FIGS. 6-8 second example of transformable seat assembly 62 includes seat support structure 12 and back support structure 14 connected to seat support structure 12 with hinge 16, which defines an axis of rotation 17. Actuator assembly 18' includes cylinder 20' and piston 22' positioned within cylinder 20'. Cylinder 20' is secured to one of back support structure 14 or seat support structure 12. In this example cylinder 20' is secured to seat support structure 12. Piston 22' is secured to the other of the one of back support structure 14 or seat support structure 12 and in this example is secured to back support structure 14. In this second example, seat assembly 62 has actuator assembly 18' wherein cylinder 20' is pivotally secured to one of back support structure 14 or seat support structure 12 and in this example cylinder 20' is pivotally secured to seat support structure 12 with pivot connector 42. In this second example, seat assembly 62 has actuator assembly 18' wherein piston 22' is pivotally secured to one of back support structure 14 or seat support structure 12 and in this example piston 22' is pivotally secured to back support structure 14 with pivot connector 44.

Blocking member 24' is positioned within and adjustable along cylinder 20'. Blocking member 24', as shown in FIGS. 9A and 9B, is shown in first position 26', wherein first position 26' is the same position for second example of transformable seat assembly 62 in FIGS. 9A and 9B. In FIG. 6, in this example, back support structure 14 is positioned in upright position U. Back support structure 14, for example, is locked in position with traditional locking and unlocking engagements for such second example of transformable seat assembly 62, which can be found in use as mentioned above within an aircraft passenger seat for example. An occupant can sit down on transformable seat assembly 62 and the occupant can choose to recline back support structure 14. At that time the occupant can push an actuator button, not shown, which can unlock a locking securement of back support structure 14 and allow occupant to rotate back support structure 14, about axis of rotation 17 of hinge 16 in direction R as seen in FIG. 7 to first reclined position FR. With transformable seat assembly 62 positioned in upright position U, as seen in FIG. 6, piston 22' is positioned abutting blocking member 24' as seen in FIG. 9A. With blocking member 24' in first position 26', piston 22' has piston head 23' is permitted to travel between abutting blocking member 24' in first limit position 30' limiting linear travel of piston 22' in first direction 28 and end 58 of cylinder 20' spaced apart in an opposing second direction 66 from blocking member 24', such that with piston head 23' traveling to end 58 of cylinder 20', rotational travel of the back support structure 14, about axis of rotation 17, is limited from rotating back support structure 14 beyond first reclined position FR, as seen in FIG. 7.

In second example of transformable seat assembly 62, an occupant can sit down and choose to recline back support structure 14. At that time, occupant, as mentioned above, can push an actuator button, not shown, which unlocks a locking securement of back support structure 14 and allows occupant to rotate back support structure 14 in direction R as shown in FIG. 7 to first reclined position FR. However, with transformable seat assembly 62 being unoccupied, with blocking member 24' in second position 33' as seen in FIG. 9C, blocking member 24' permits linear travel of piston 22' in first direction 28 relative to cylinder 20' beyond first limiting position 30' such that rotational travel of back support structure 14, about axis of rotation 17, rotates into overlying position 68, as seen in FIG. 8, relative to seat support structure 12. With back support structure 14 in overlying position with respect to seat support structure 12, occupant of seat assembly 64 is provided an opportunity to extend their legs outwardly and rest them upon back support structure 14. The rotation of back support structure 14 provides occupant of seat assembly 64 an opportunity to utilize unused space of unoccupied transformable seat assembly 62 to optimize comfort to occupant of seat assembly 64.

As earlier mentioned seat cushion 34 is in an overlying position to seat support structure 12 and back cushion 38 and lumbar cushion 40 is in an overlying position relative to back support structure 14. Lumbar cushion 40, in this example, is releasably secured to at least one of back cushion 38 or back support structure 14. Releasable securement can be achieved by one of a number of securement arrangements such as for example with snaps or by way of a sheet of one of a plurality of flexible hooks or loops secured to lumbar cushion and another sheet of other of the plurality of flexible hooks or loops secured to at least one of the back support structure 14 or back cushion 38. Bringing these sheets together engage the plurality of flexible hooks and loops providing a releasable securement. This releasable securement can permit removal of lumbar cushion 40, as seen removed in FIG. 8, which permits positioning back support structure 14 in overlying position overlying seat support structure 12 without lumbar cushion 40 providing any obstruction to attaining the overlying position 68. With lumbar cushion 40 removed from the overlying position with respect to back support structure 14 and back support structure 14 is rotated about axis of rotation 17 and positioned in overlying relationship with respect to the seat support structure 12, back cushion 38 is positioned in contact with seat cushion 34 providing a desirable elevation for which legs of occupant of seat assembly 64 can rest upon back support structure 14 of transformable seat assembly 62.

In addition, cylinder 20' is pivotally secured to one of back support structure 14 or seat support structure 12. Piston 22' is pivotally secured to one of the other of the back support structure 14 or seat support structure 12. The pivotal securement permits rotation of cylinder 20', in this example, relative to seat support structure 12 with back support structure rotating about axis of rotation 17 and permits rotation of piston 22', in this example, relative to back support structure 14 with back support structure 14 rotating about axis of rotation 17, as seen in FIG. 8.

Figure 9:
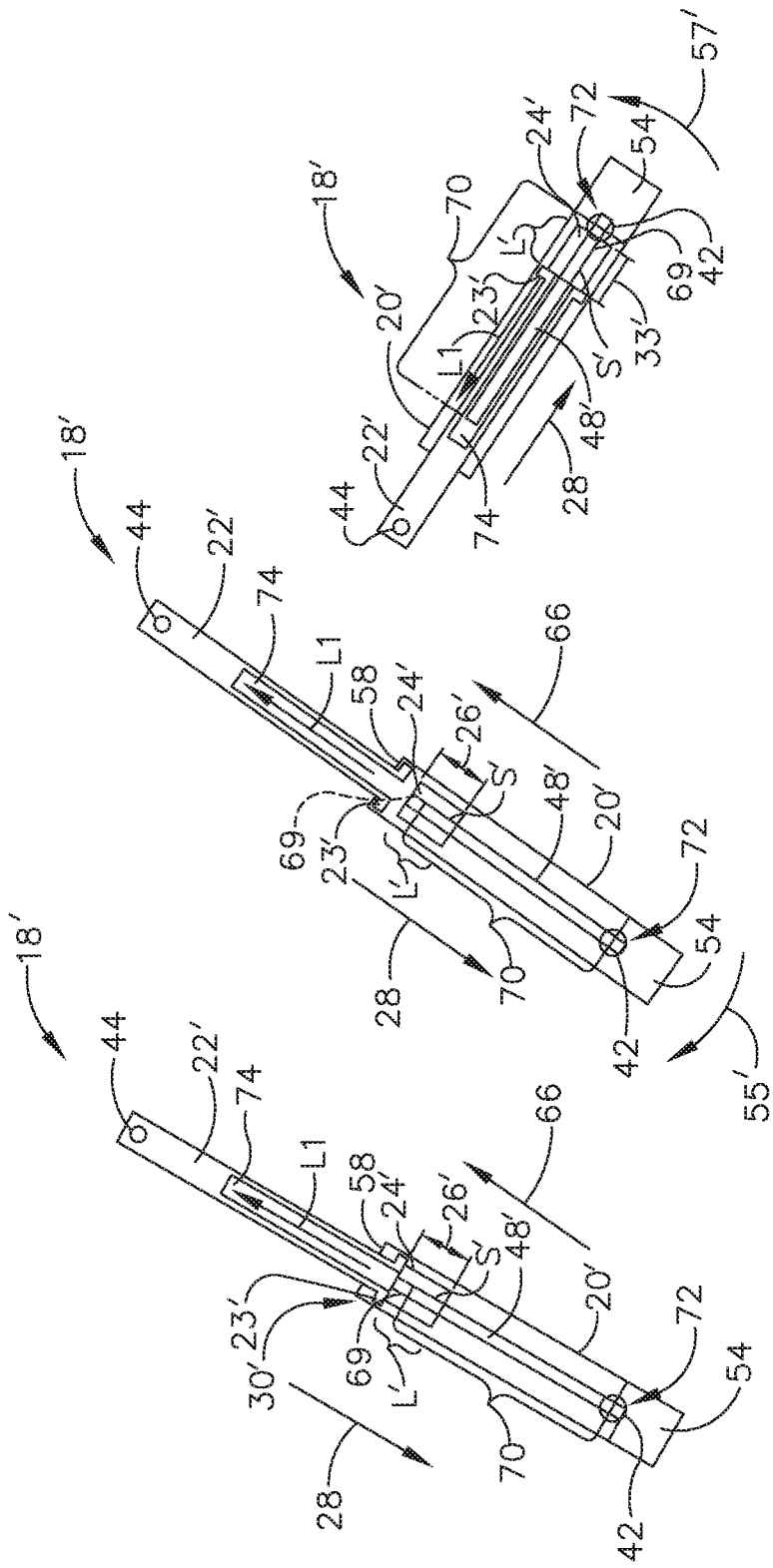
FIG. 9A is an enlarged view of the actuator assembly of FIG. 6.
FIG. 9B is an enlarged view of the actuator assembly of FIG. 7.
FIG. 9C is an enlarged view of the actuator assembly of FIG. 8.

To attain the positions of back support structure 14 to be in upright position U, first reclined position FR and an overlying position 68 relative to seat support structure 12 as shown in FIGS. 8-9C, blocking member 24' of actuator assembly 18' includes opening 69 defined by blocking member 24', which extends along length L' and through blocking member 24'. A plurality of threads (not shown) defined by blocking member 24' are positioned along surface S' of opening 69 within blocking member 24'. Threaded shaft 48' associated with the plurality of threads (not shown) defined by blocking member 24', wherein threaded shaft 48' defines plurality of threads (not shown) compatible with the plurality of threads (not shown) defined by blocking member 24'. First end portion 70 of threaded shaft 48', as seen in FIGS. 9A-C, engages the plurality of threads (not shown) defined by blocking member 24'. Second end portion 72 of threaded shaft 48' is connected to motor 54, which imparts rotation to threaded shaft 48' resulting in linear movement of blocking member 24' along cylinder 20'. In addition, in this example, piston 22' defines opening 74 which extends within and along length L1 of piston 22'. With motor 54 activated to rotate threaded shaft 48' in first rotational direction 55', in this example as seen in FIG. 9B, blocking member 24' travels from first position 26' to second position 33' as seen in FIG. 9C. With piston head 23' abutting blocking member 24' and blocking member 24' moving toward second position 33', threaded shaft 48' extends through and beyond opening 69 in blocking member 24', as seen in FIG. 9C, and into opening 74 defined by piston 22', which extends within and along length L1 of piston 22'. With blocking member 24' in second position 33' rotation of threaded shaft 48' by motor 54 in second rotational direction 57', in this example as seen in FIG. 9C, moves blocking member 24' along threaded shaft 48' and toward first position 26', as seen in FIGS. 9A and 9B. With blocking member 24' in first position 26' with piston head 23' in abutting relationship to blocking member 24', back support structure 14 is positioned in upright position U, as seen in FIGS. 6 and 9A. With piston head 23' positioned at end 58 of cylinder 20', back support structure 14 is positioned in first reclined position FR, as seen in FIGS. 7 and 9B. With piston head 23' abutting blocking member 24' with blocking member in second position 33', as seen in FIG. 9C, back support structure 14 is in overlying position 68 with respect to seat support structure 12, as seen in FIG. 8. With back support structure 14 in overlying position 68 with respect to seat support structure 12, occupant of seat assembly 64 can optimize their comfort with use of available space with transformable seat assembly 62 being unoccupied with resting their legs upon back support structure 14.

Figure 10:
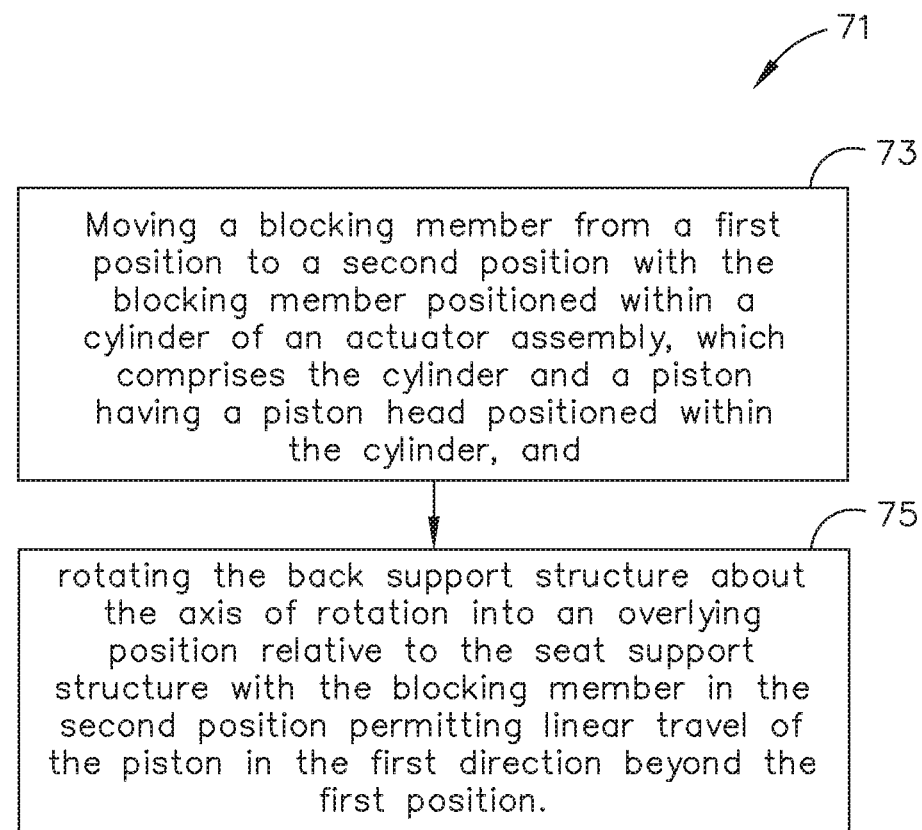
FIG. 10 is a flow chart of a method for transforming the second example of the transformable seat assembly of FIG. 6.

Method 71 for transforming transformable seat assembly 62, includes step 73, as seen in FIG. 10, of moving blocking member 24' positioned within cylinder 20' of actuator assembly 18', which includes cylinder 20' and piston 22' having piston head 23' positioned within cylinder 20', from first position 26' to second position 33'. Transformable seat assembly 62 includes seat support structure 12 connected to back support structure 14 with hinge 16, which defines axis of rotation 17. Cylinder 20' is secured to one of back support structure 14 or seat support structure 12 and piston 22' is secured to the other of the one of the back support structure 14 or seat support structure 12. With blocking member 24' in first position 26', piston head 23' is permitted to travel between, abutting blocking member 24' in a first limit position 30' limiting linear travel of piston 22' in first direction 28 and end 58 of cylinder 20' positioned spaced apart in opposing second direction 66 from blocking member 24', such that with piston head 23' traveling to end 58 of cylinder 20', rotational travel of back support structure 14 about axis of rotation 17 is limited from rotating back support structure 14 beyond first reclined position FR. Method 71 further includes step 75 of rotating back support structure 14 about axis of rotation 17 into an overlying position relative to the seat support structure 12 with blocking member 24' in second position 33' permitting linear travel of piston 22' in first direction 28 beyond first limit position 30'.

Transformable seat assembly 62 further includes seat cushion 34 positioned in overlying relationship to seat support structure 12 and back cushion 38 and lumbar cushion 40 positioned in overlying relationship to back support structure 14. Lumbar cushion 40, in this example, as described earlier is releasably secured to back support structure 14. Method 71 further includes, in this example, removing lumbar cushion 40 from back support structure 14 for facilitating placing back support structure 14 in overlying position 68 with respect to seat support structure 12 as earlier described.

With cylinder 20' pivotally secured to one of back support structure 14 or seat support structure 12 and piston 22' pivotally secured to other of the one of back support structure 14 or seat support structure 12, rotating back support structure 14 about axis of rotation 17 includes cylinder 20' pivotally rotating relative to the one of the back support structure 14 or seat support structure 12 and includes piston 22' pivotally rotating relative to the other of the one of the back support structure 14 or seat support structure 12.

Step 73 of moving blocking member 24' positioned within cylinder 20' further includes activating motor 54 to rotate threaded shaft 48'. Opening 69 defined by blocking member 24' extends along length L' of and through blocking member 24'. Plurality of threads (not shown) which are defined by blocking member 24' are positioned along surface S' of opening 69 within blocking member 24'. Threaded shaft 48', associated with the plurality of threads (not shown) defined by blocking member 24', defines plurality of threads (not shown) which are compatible with plurality of threads (not shown) defined by blocking member 24'. Plurality of threads (not shown) of first end portion 70 of threaded shaft 48' engage the plurality of threads (not shown) defined by blocking member 24' and a second end portion 72 of threaded shaft 48' is connected to motor 54, as seen in FIGS. 9A-C. Motor 54 imparts rotation to threaded shaft 48' resulting in linear movement of blocking member 24' along threaded shaft 48' and along cylinder 20'.

With rotating of threaded shaft 48' by motor 54 in first rotational direction 55', as seen for example in FIG. 9B, blocking member 24' moves from first position 26' to second position 33' as seen in FIG. 9C. With the piston head 23' abutting blocking member 24' and blocking member 24' moving toward second position 33', threaded shaft 48' extends through and beyond opening 69 in blocking member 24' and into opening 74 which extends within and along length L1 of piston 22', as seen in FIG. 9C. With threaded shaft 48' positioned within opening 69 of piston 22', back support structure 14 is overlying position 68 with respect to seat support structure as seen in FIG. 8. With blocking member 24' in second position 33', as seen in FIG. 9C, rotation of threaded shaft 48' by motor 54 in second rotational direction 57' moves blocking member 24' along threaded shaft 48' and toward first position 26' such that with blocking member 24' in first position 26', as seen in FIG. 9A, and piston head 23' abuts blocking member 24', back support structure 14 is positioned in upright position U, as seen in FIG. 6. With piston head 23' positioned at end 58 of cylinder 20', as seen in FIG. 9B, back support structure 14, as seen in FIG. 7, is positioned in first reclined position FR. With piston head 23' positioned abutting blocking member 24' with block member in second position 33', back support structure 14 is in overlying position 68 with respect to seat support structure 12 such that occupant of seat assembly 64 can rest their legs upon back support structure 14 optimizing comfort to the occupant with utilizing unoccupied transformable seat assembly 62.

Figure 11:
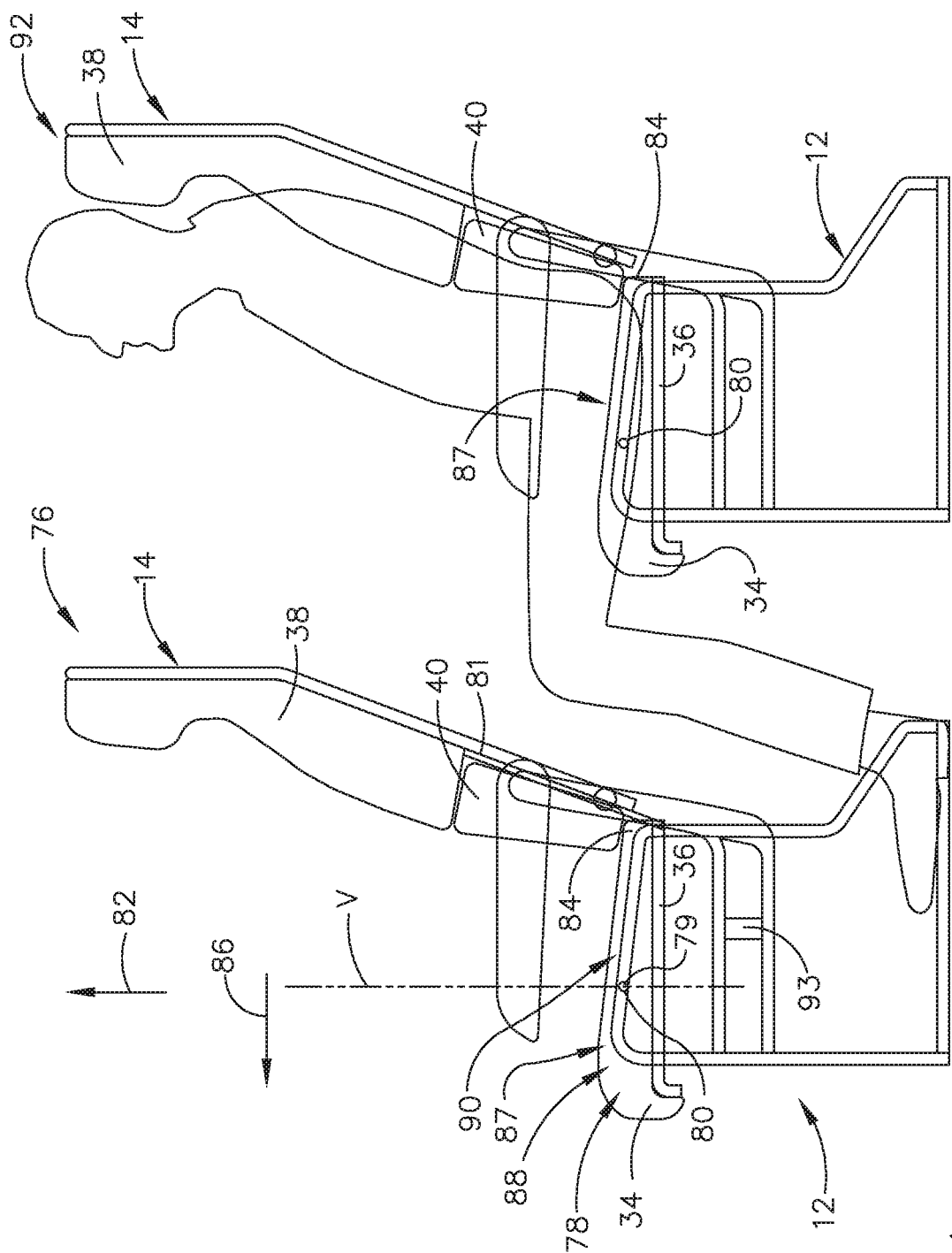
FIG. 11 is a side elevation schematic view of a first embodiment of a third example of a transformable seat assembly which is unoccupied and an occupant occupying a seat assembly positioned behind and adjacent to the third example of the transformable seat assembly.
Figure 12:
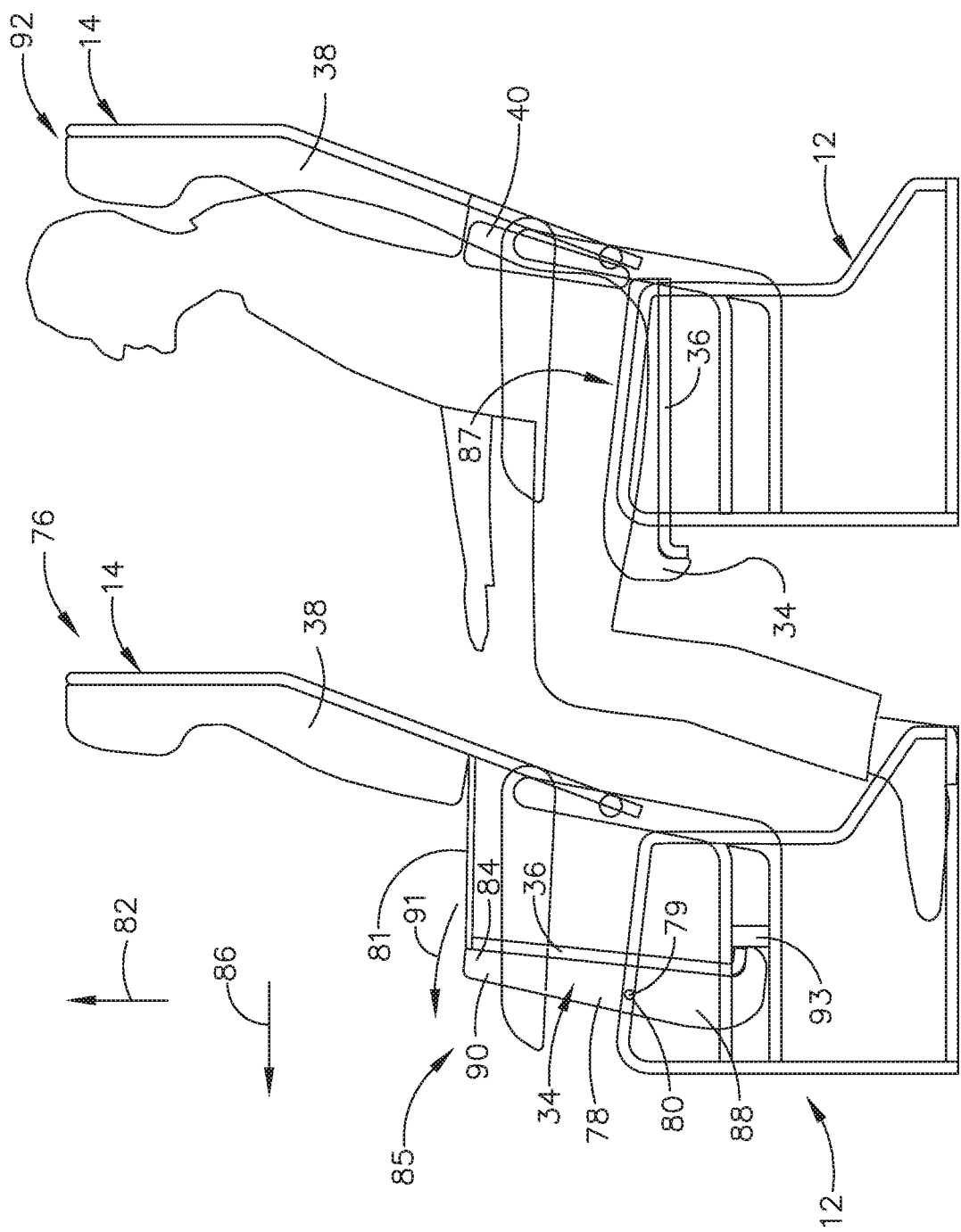
FIG. 12 is the view of the first embodiment of the third example of the transformable seat assembly of FIG. 11 with a lumbar cushion removed from the unoccupied the transformable seat assembly and the seat of the transformable seat assembly rotated forward providing the occupant of the seat assembly positioned behind and adjacent to the first embodiment of the third example of the transformable seat assembly more usable knee room.
Figure 17:
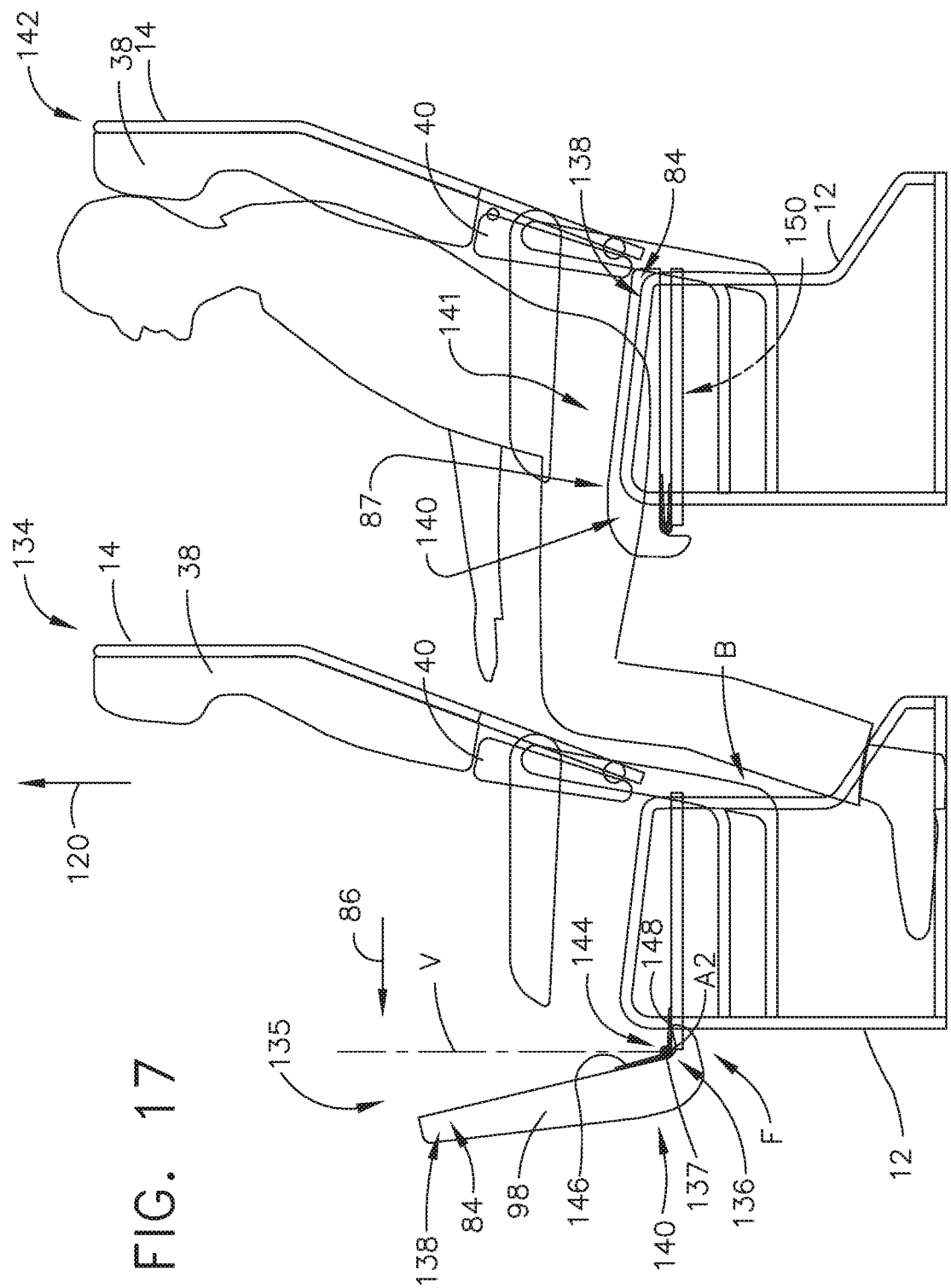
FIG. 17 is a side elevation schematic view of a second embodiment of the third example of the transformable seat assembly with a seat rotated relative to a seat support structure.
Figure 18:
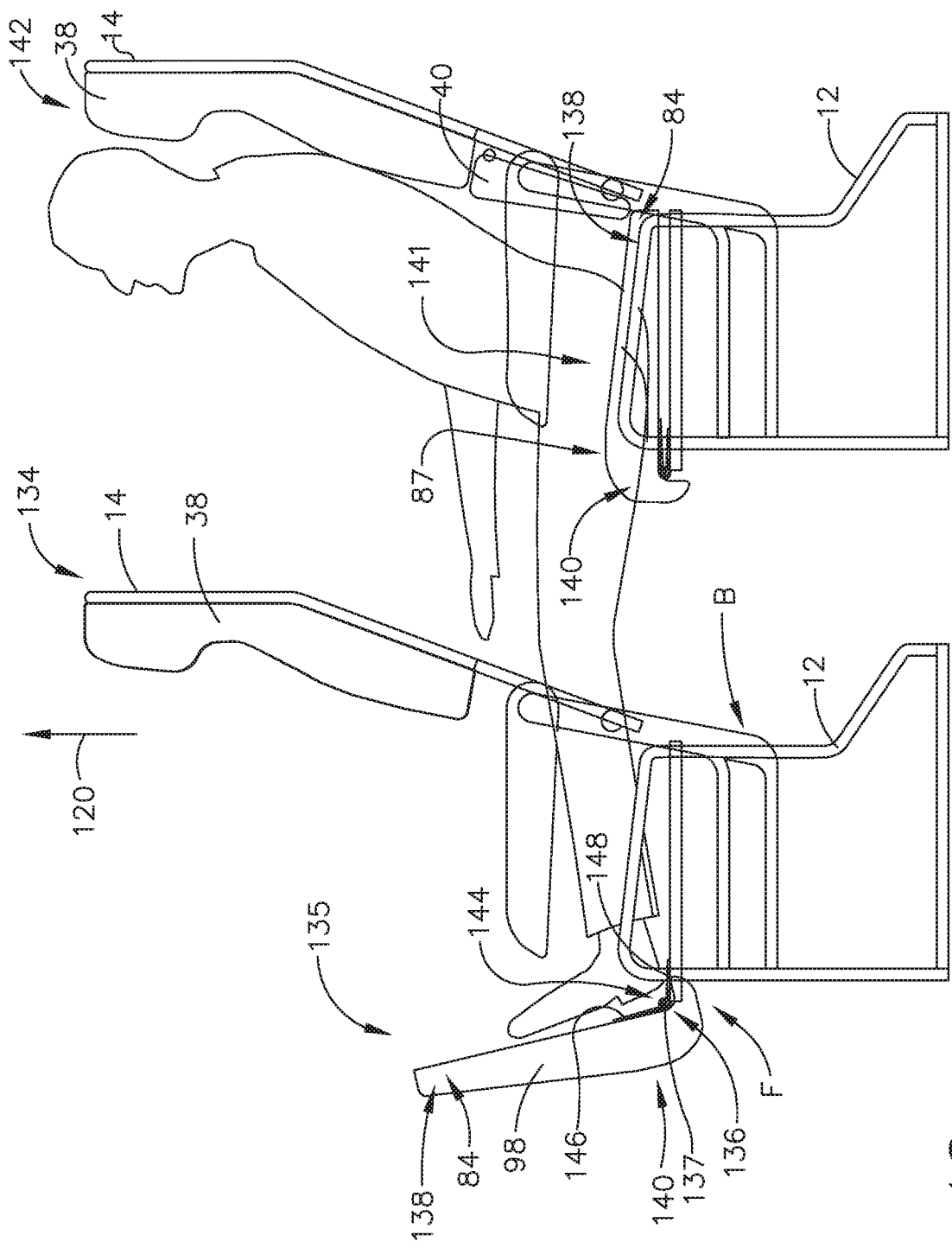
FIG. 18 is a view of the second embodiment of the third example of the transformable seat assembly of FIG. 17 with a lumbar cushion removed providing an occupant, of a seat assembly positioned behind and adjacent to the second embodiment of the third example of the transformable seat assembly, the ability to extend their legs and support their legs with a seat support structure of the second embodiment of the third transformable seat assembly.
Figure 19:
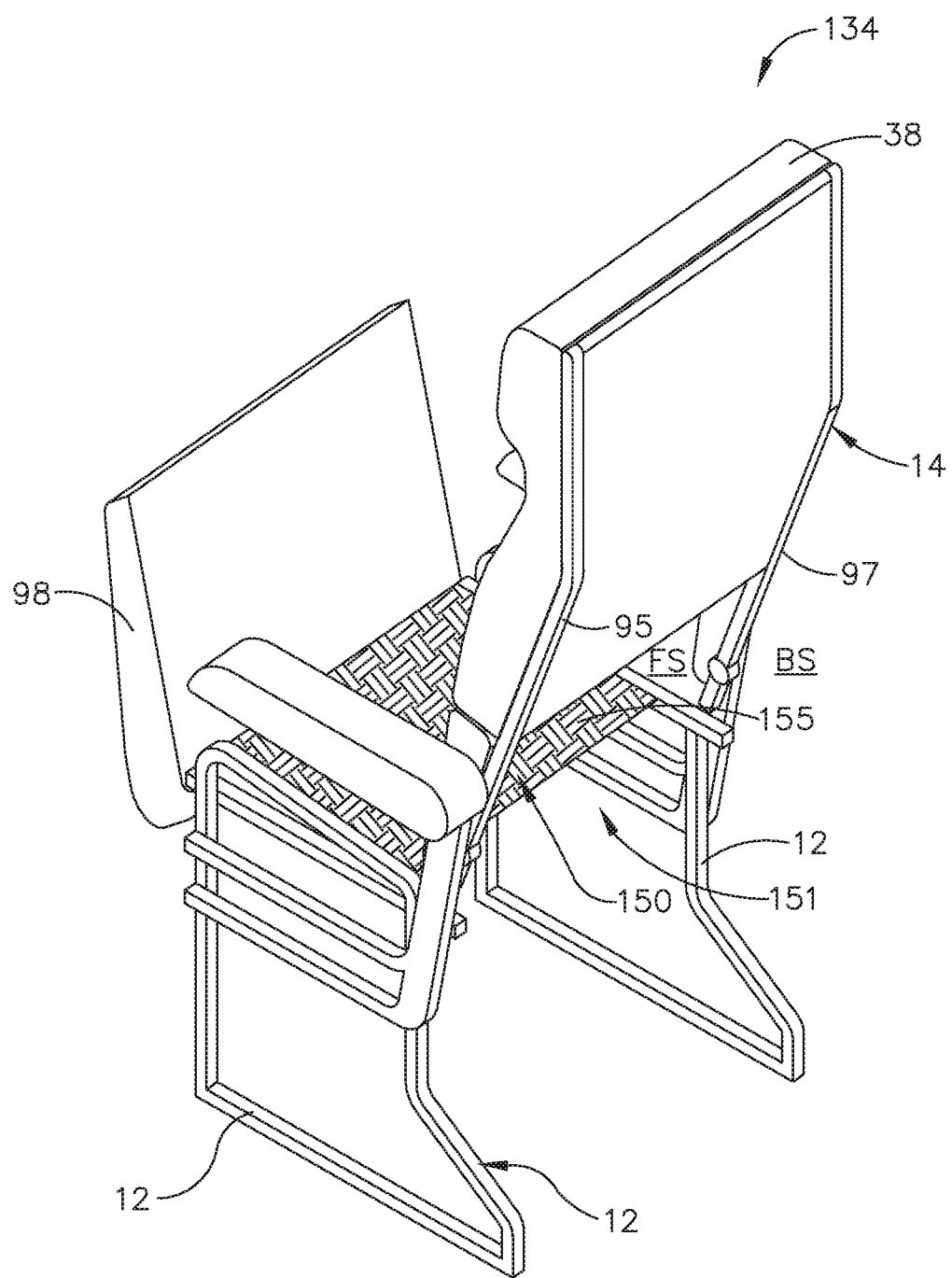
FIG. 19 is a schematic rear perspective view of the second embodiment of the third example of the transformable seat assembly of FIG. 17.

In referring to FIGS. 11 and 12, a first embodiment of third example of transformable seat assembly 76 is shown and in referring to FIGS. 17-19, a second embodiment of third example of transformable seat assembly 134 is shown. In referring to FIGS. 11 and 12, transformable seat assembly 76 includes seat support structure 12 and seat 78 connected to seat support structure 12 with hinge 80. Hinge 80 defines axis of rotation 79 which provides for rotation of seat 78 in direction of rotation 91 relative to seat support structure 12, as seen in FIG. 12. Back support structure 14 is connected to seat support structure 12 and extends in upward direction 82 relative to seat support structure 12. Back cushion 38 is secured to back support structure 14 and lumbar cushion 40, as seen in FIG. 11, extends along back support structure 14 positioned between back cushion 38 and seat 78. Lumbar cushion 40 is releasably secured to one of back cushion 38 and back support structure 14. This releasable securement can be provided with, for example, use of a first sheet (not shown) of a plurality of one of flexible hooks (not shown) or flexible loops (not shown) that is secured to lumbar cushion 40 and second sheet (not shown) of a plurality of the other of one of flexible hooks (not shown) or flexible loops (not shown) that is secured to at least one of back support structure 14 or back cushion 38 such that first sheet (not shown) and the second sheet (not shown) releasably secure to one another with engagement of the flexible loops and the flexible hooks. As a result, lumbar cushion 38 can maintain position with respect to transformable seat assembly 76 with transformable seat assembly 76 occupied and can be removed from back cushion 38 and/or back support structure 14 when transformable seat assembly 76 is unoccupied and lumbar cushion 40 is not required.

End portion 84 of seat 78 is positioned closer to back support structure 14 than hinge 80 with seat 78 positioned in an occupant support position 87, as seen in FIG. 11 wherein seat 78 is in overlying relationship to seat support structure 12. End portion 84 of seat 78 can be rotated in direction of rotation 91 about axis of rotation 79 of hinge 80, as seen in FIG. 12, which includes upward direction 82 and direction 86 away from back support structure 14. In first embodiment of third example of transformable seat assembly 76, as seen in FIG. 12, with seat 78 rotated from an occupant support position 87 and lumbar cushion 40 removed occupant of seat assembly 92 removes seat 78 and lumbar cushion 40 as an obstacle to occupant of seat assembly 92. Occupant of seat assembly 92, as a result, acquires additional knee space and enhanced comfort to occupant with transformable seat assembly 76 being unoccupied, as will be described in more detail.

Seat 78 includes in this example, seat cushion 34 overlies and is supported with seat support frame 36 of seat support structure 12. In the first embodiment of third example of transformable seat assembly 76, seat 78 includes first portion 88 and second portion 90 separated by vertical plane V which extends through axis of rotation 79 of hinge 80, as seen in FIG. 11. First portion 88 is positioned further from back support structure 14 than second portion 90, with seat 78 in occupant support position 87. First portion 88 has a first weight and second portion 90 has a second weight such that the first weight is greater than the second weight. Seat 78 can rotate in direction of rotation 91, as seen in FIG. 12, to stop member 93 secured to seat support structure 12 and positioned within the travel of seat 78. Stop member 93 blocks any further rotation of seat 78 and first weight of first portion 88 of seat 78 maintains seat 78 in the rotated position as seen in FIG. 12.

Further included in this example, is connector member 81 which is connected to back support structure 14 and is secured to second portion 90 of seat 78. Connector member 81 can be constructed of a flexible material such as nylon or other strong flexible material or can be constructed of a more rigid material such as metal or plastic and rotatably secured to second portion 90 of seat 78 and rotatably secured to back support structure 14. Connector member 81 can be used in addition to or in replacement of stop member 93 to prevent over rotation of seat 78 with seat 78 rotated in direction of rotation 91.

With occupant positioned in seat assembly 92, which is positioned behind and adjacent to first embodiment of third example of transformable seat assembly 76, and first embodiment of third example of transformable seat assembly 76 is unoccupied, occupant of seat assembly 92 can have an option of removal of lumbar cushion 40 and rotation of end portion 84 of seat 78 in direction of rotation 91 about hinge 80. Seat 78 includes, in this example and mentioned earlier, seat cushion 34 and seat support frame 36 upon which the seat cushion 34 is supported and overlies. Removal of lumbar cushion 40 and rotation of seat 78, which includes seat cushion 34 and seat support frame 36, removes lumbar cushion 40 and seat 78 as obstacles with respect to occupant of seat assembly 92 accessing usable space of transformable seat assembly 76 of FIG. 12.

In this first embodiment of the third example of transformable seat assembly 76, as seen in FIGS. 11 and 12, with lumbar cushion 40 removed from between back cushion 38 and seat 78, access, as seen in FIG. 19, is provided from back side BS of back support structure 14 to beyond front side FS of back support structure 14 through an opening 151, as seen for an example in FIG. 19, defined by first support structure 95 spaced apart from second support structure 97 of back support structure 14. In addition with end portion 84 of seat 78 rotated in direction of rotation 91 about hinge 80 from occupant support position 87, as seen in FIGS. 11 and 12, access is provided to space end portion 84 of seat 78 occupied prior to being rotated from occupant support position 87. This transformation of first embodiment of second example of transformable seat assembly 76 provides occupant of seat assembly 92 an opportunity, as mentioned earlier, to obtain more knee room and enhanced comfort with transformable seat assembly 76 unoccupied.

In referring to FIGS. 17-18, second embodiment of third example of transformable seat assembly 134 example is shown including seat support structure 12 and seat 98 connected to seat support structure 12 with hinge 136. Hinge 136 is positioned on front side portion F of seat support structure 12 spaced apart from back support structure 14 in direction 86 away from back support structure 14. Seat 98 includes first end portion 138 which includes end portion 84 of seat 98 and second opposing end portion 140. With seat 98 in an occupant support position 141 as seen with respect to seat assembly 142 positioned behind and adjacent to transformable seat assembly 134, first end portion 138 is positioned closer to back support structure 14 than second opposing end portion 140. With seat 98 of transformable seat assembly 134 in a deployed position 135 rotated from occupant support position 141 about axis of rotation 137 of hinge 136, seat 98 extends in upward direction 120 away from seat support structure 12. In this example, seat 98 extends rotated in forward direction 86 beyond vertical plane V, as seen in FIG. 17. This position is resiliently maintained, in this example, with hinge 136 being torsion spring 144, wherein torsion spring 144 includes first arm 146 abutting seat 98 and second arm 148 abutting seat support structure 12.

In this example, seat 98 unused or unoccupied will be positioned in deployed position 135 as shown in FIGS. 17 and 18. Torsion spring 144 will maintain seat 98 in the deployed position until an occupant sits onto seat 98 rotating seat into occupied support position as seen with respect to seat assembly 142 wherein seat 98 is positioned into occupant support position 141 such that seat 98 overlies seat support structure 12 and seat support structure 12 provides support to the occupant and seat 98.

Second embodiment of third example of transformable seat assembly 134 includes back cushion 38 overlying back support structure 14. Seat 98 includes, in this example, seat cushion 34. Further included is lumbar cushion 40 positioned between back cushion 38 and seat cushion 34. As described earlier, lumbar cushion 40 is releasably secured to one of back support structure 14 or back cushion 38. With transformable seat assembly 134 unoccupied, occupant in seat assembly 142 positioned behind and adjacent to transformable seat assembly 134 can choose to have lumbar cushion 40 removed, as seen in FIG. 18.

In this example seat support structure includes a support structure 150, as seen for example in FIG. 19. Support structure 150 is positioned below seat 98 with seat 98 in occupant support position 141 as shown for example in FIGS. 17-19. Support structure 150 is accessible from a back side BS of back support structure 14 with lumbar cushion 40 removed, as seen in FIGS. 18 and 19, from back support structure 14 unblocking opening 151, as seen for example in FIG. 19, which is defined by first support structure 95 spaced apart from second support structure 97 of back support structure 14 and with end portion 84 of seat 98 rotated about axis of rotation 137 away from occupant support position 141. Transformable seat assembly 134 provides occupant of seat assembly 142 additional usable space with respect to unoccupied transformable seat assembly 134. As a result, occupant as seen in FIG. 18, can extend their legs through to transformable seat assembly 134 wherein support structure 150, as seen for example in FIG. 19, can provide support to occupant's legs. In this example, support structure 150 includes webbing 152 secured to seat support structure 12 such that occupant of seat assembly 142 can have their legs supported with webbing 155.

In referring to FIG. 17, transformable seat assembly 134 includes seat support structure 12 and seat 98 connected to seat support structure 12 with hinge 136 having axis of rotation 137 which includes torsion spring 144 providing for rotation of seat 98 relative to seat support structure 12. Transformable seat assembly 134 further includes back support structure 14 connected to seat support structure 12 and back support structure 14 extends in upward direction 120 relative to seat support structure 12. Torsion spring 144 is positioned on front portion F of seat support structure 12 spaced apart from back support structure 14 in direction 86 away from back support structure 14. Torsion spring 144 resiliently maintains seat 98 extending away from seat support structure in deployed position 135. Lumbar cushion 40 is removably positioned in overlying position relation to back support structure 14. When seat 98 is occupied, as seen in FIG. 17, with seat assembly 142, seat 98 rotates about axis of rotation 137 of torsion spring 144 from deployed position 135 as seen in FIG. 17 with respect to seat assembly 134, to occupant support position 141 with respect to seat assembly 142, with seat support structure 12 providing support to seat 98. When the seat becomes unoccupied, torsion spring 144 positions seat 98 with rotating seat 98 about axis of rotation 137 from occupant support position 141, as seen with respect to transformable seat assembly 142, to deployed position 135 wherein seat 98 extends away from seat support structure. This positioning of seat 98 in deployed position 135 with seat 98 unoccupied provides many benefits to those for example who service an aircraft. The deployed position 135 provides for ease in cleaning underneath seats as well as for ease with respect to routine inspections.

Figure 20:
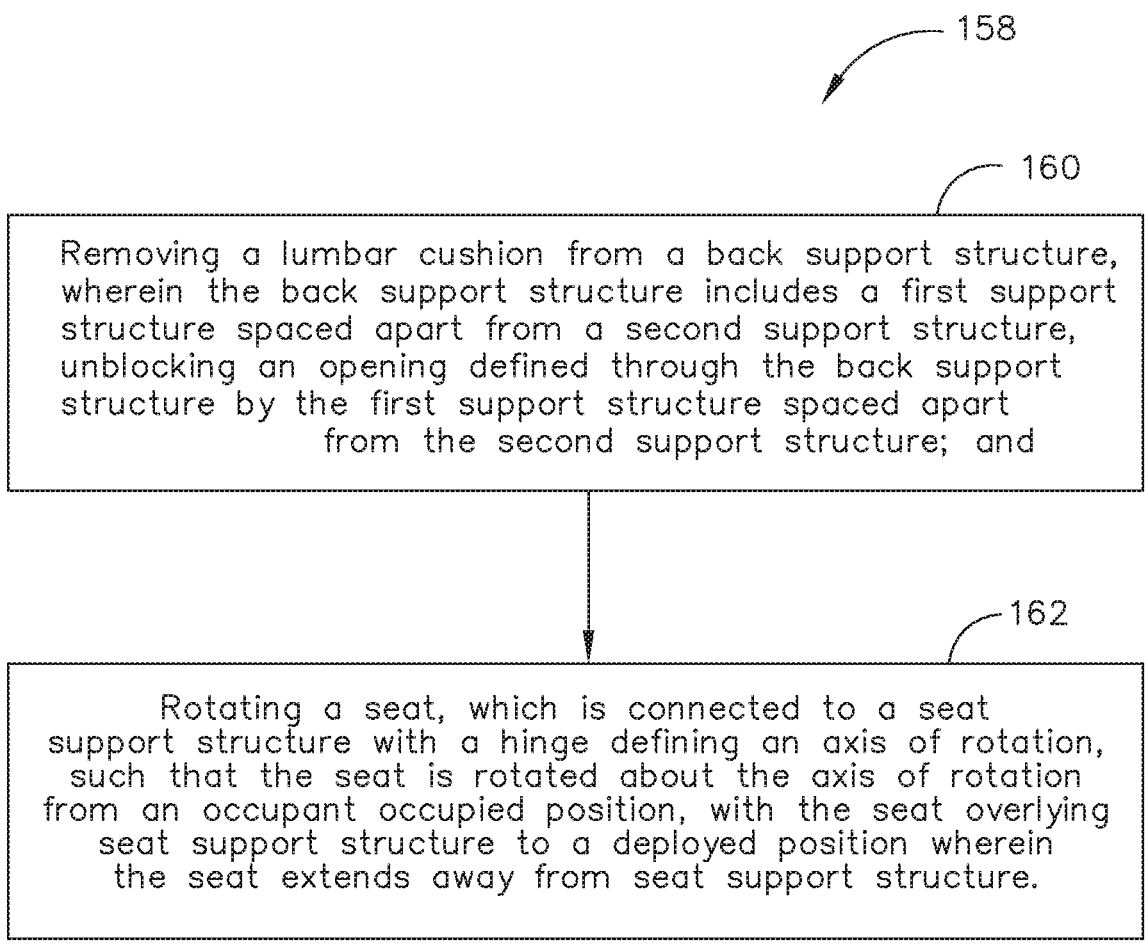
FIG. 20 a flow chart of a method for transforming the third example of the transformable seat assembly.

In referring to FIG. 20, method 158 for transforming transformable seat assembly, includes step 160 of removing lumbar cushion 40 from back support structure 14, wherein back support structure 14 defines opening 151 through back support structure 14, as seen for example in FIG. 19, and removal of lumbar cushion 40 unblocks opening 151.

Method 158 further includes step 162 of rotating a seat 78, which is connected to seat support structure 12 with hinge 80 defining axis of rotation 79, such that seat 78 is rotated about axis of rotation 79 from occupant support position 87, with seat 78 overlying seat support structure 12, to deployed position 85 wherein seat 78 extends away from seat support structure 12.

Step 160 of removing lumbar cushion 40 further includes disengaging lumbar cushion 40 from at least one of back cushion 38 secured to the back support structure 14 or back support structure 14. Disengaging in this example includes unsecuring releasably secured lumbar cushion 40 from one of back support structure 14 or back cushion 38 as discussed earlier with respect to lumbar cushion 40 being releasably secured to back support structure 14 or back cushion 38. Back support structure 14 defines opening 151, as seen for example in FIG. 19, with first support structure 95 of back support structure 14 spaced apart from second support structure 97 of back support structure 14. Step 162 of rotating seat 78 includes end portion 84 of seat 78 positioned closer to back support structure 14 than hinge 80 with seat 78 in occupant support position 87, rotates in upward direction 82 away from seat support structure 12 and in direction 86 away from back support structure 14. Method 158 provides occupant of a seat assembly positioned adjacent and behind an unoccupied transformable seat assembly to access usable space of an unoccupied transformable seat assembly to enhance the occupant's comfort.

Figure 13:
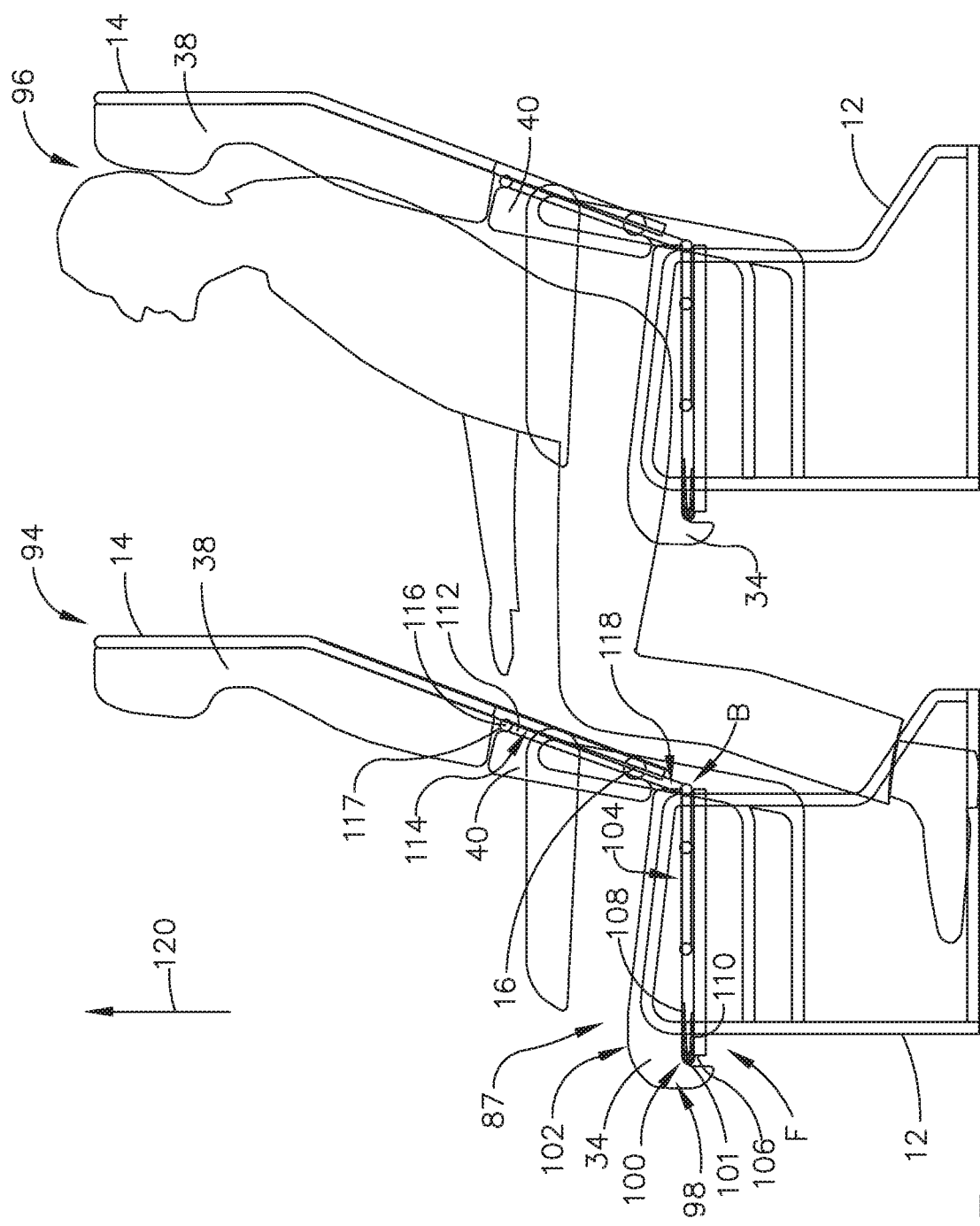
FIG. 13 is a side elevation schematic view of a fourth example of a transformable seat assembly which is unoccupied and an occupant occupying a seat assembly positioned behind and adjacent to the fourth example of the transformable seat assembly.
Figure 14:
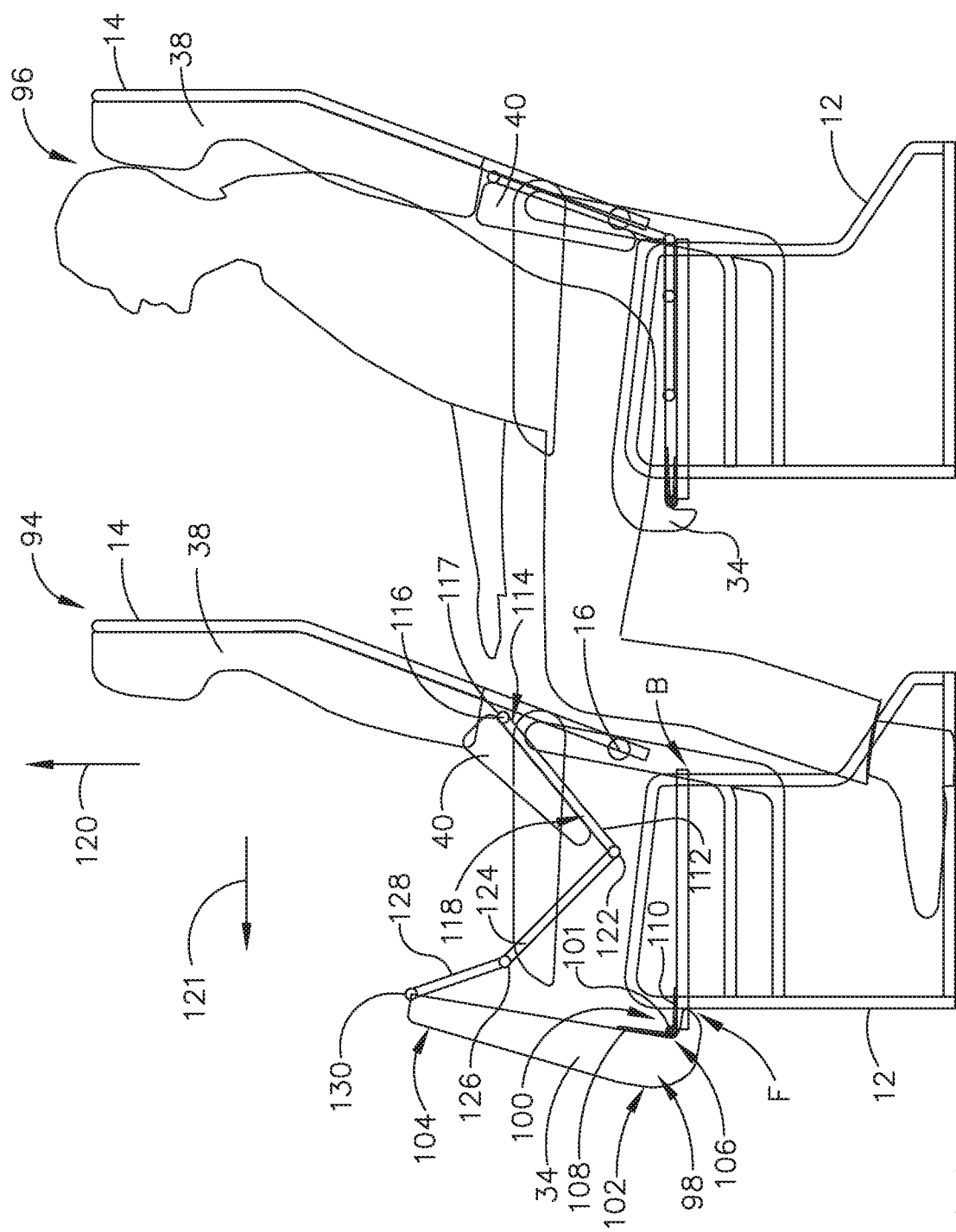
FIG. 14 is the view of the fourth example of the transformable seat assembly of FIG. 13 wherein a wall member with a lumbar cushion secured to the wall member rotates relative to a back support structure and a seat rotates relative to a seat support structure.
Figure 15:
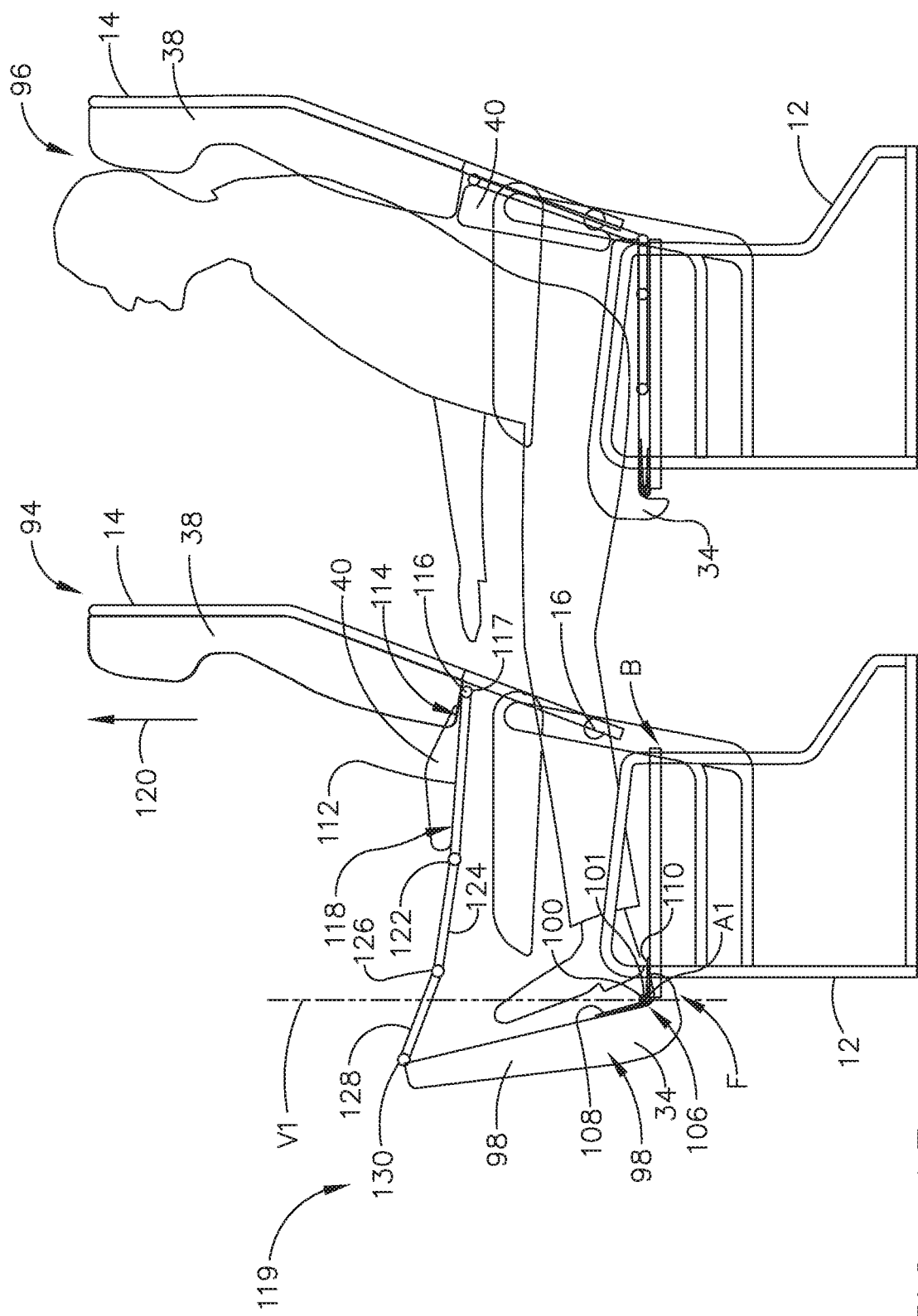
FIG. 15 is the view of the fourth example of the transformable seat assembly of FIG. 14 wherein the wall member with the lumbar cushion and the seat have fully rotated providing the occupant occupying the seat assembly positioned behind and adjacent to the fourth example of the transformable seat assembly an ability to extend their legs onto a seat support of the fourth example of the transformable seat assembly.

In referring to FIGS. 13-15, fourth example of transformable seat assembly 94 is shown in which fourth example of transformable seat assembly 94 includes seat support structure 12 and seat 98 connected to seat support structure 12 with first hinge 100, having first axis of rotation 101 which provides for rotation of seat 98 relative to seat support structure 12. In this example, seat 98 includes seat cushion 34. Back support structure 14 is connected to seat support structure 12, in this example, with hinge 16 and back support structure 14 is positioned on back side B of seat support structure 12. Back support structure 14 further includes back cushion 38 secured to back support structure 14. First hinge 100 is positioned on an opposing front side F of seat support structure 12.

Seat 98 has front end portion 102 and rear end portion 104 such that with seat 98 of fourth example of transformable seat assembly 94 in an occupant support position 87, as seen in FIG. 13, rear end portion 104 is positioned closer to back support structure 14 than front end portion 102. As seen in FIG. 11, front end portion 102 of seat 98 is positioned overlying first hinge 100. In this example, first hinge 100 includes a torsion spring 106 with first arm 108 of torsion spring 106 positioned against seat 98 and second arm 110 positioned against seat support structure 12. Front end portion 102 of seat 98 is positioned overlying first hinge 100.

Fourth example of transformable seat assembly 94 further includes wall member 112 having first end portion 114 connected to back support structure 14 with second hinge 116 having second axis of rotation 117. Transformable seat assembly 94 is rotatable about first axis of rotation 101 from an occupant support position 87 overlying seat support structure 12, as seen in FIG. 13 to deployed position 119 extending away from seat support structure 12. Wall member 112 is rotatable about second axis of rotation 117 from an overlying position with respect to the back support structure 14 to wall member 112 extending away from back support structure 14 as seen in FIG. 15.

Lumbar cushion 40 is secured to wall member 112. With seat 98 in occupant support position 87, as seen in FIG. 13, lumbar cushion 40 extends between back cushion 38 and seat cushion 34. With fourth example of transformable seat assembly 94 unoccupied, occupant of seat assembly 96, positioned behind and adjacent to fourth example of transformable seat assembly 94, can optimize use of unoccupied fourth example of transformable seat assembly 94 with rotation of second opposing end portion 118 of wall member 112. Wall member 112 rotates about second axis of rotation 117 of second hinge 116 and lumbar cushion 40 rotates with wall member 112. Second opposing end portion 118 of wall member 112 further includes third hinge 122 connecting wall member 112 to, in this example, second wall member 124, as seen in FIGS. 14 and 15. Second wall member 124 further includes fourth hinge 126 connecting second wall member 124 to third wall member 128. Third wall member 128 further includes fifth hinge 130 connecting the third wall member 128 to seat 98 wherein second opposing end portion of wall member 112 is linked to seat 98 in this example.

With the seat 98 in occupant support position 87 as seen in FIG. 13, second and third wall members 124 and 128 fold with respect to each other and are positioned between seat 98 and seat support structure 12. Wall members can be constructed from one of a number of materials such as a film, plastic panel, metal panel and the like.

With seat 98 in deployed position 119 as seen in FIG. 15, seat 98 is positioned extending away from back support structure 14 and in this example extending away from vertical plane V1, which extends through central axis of rotation A1 of first hinge 100. In deployed position 119, seat 98 extends beyond vertical plane V1, the weight of seat 98 can facilitate maintaining seat 98 in deployed position 119. With the use of torsion spring 106, seat 98 can also be maintained in the deployed position 119. In addition, with seat 98 in deployed position 119, wall member 112, second wall member 124 and third wall member 128 are positioned spaced apart from at least a portion of seat support structure 12.

With seat 98 in deployed position 119 and wall member 112 rotated about second axis of rotation 117 of second hinge away from back support structure 14, wall member 112 unblocks opening 151, as seen as an example in FIG. 19. Opening 151 is defined by and through back support structure 14, for example, by first support structure 95 spaced apart from a second support structure 97 of back support structure 14. Opening 151 provides access from back side BS of back support structure 14 to front side FS of back support structure 14 and to support structure 150 of seat support structure 12. With occupant of seat assembly 96 positioned behind and adjacent to unoccupied fourth example of transformable seat assembly 94, occupant can access support structure 150 through opening 151 so as to utilize space of unoccupied fourth example of transformable seat assembly 94 to extend occupant's legs and rest them upon support structure 150 enhancing comfort to occupant of seat assembly 96.

Figure 16:
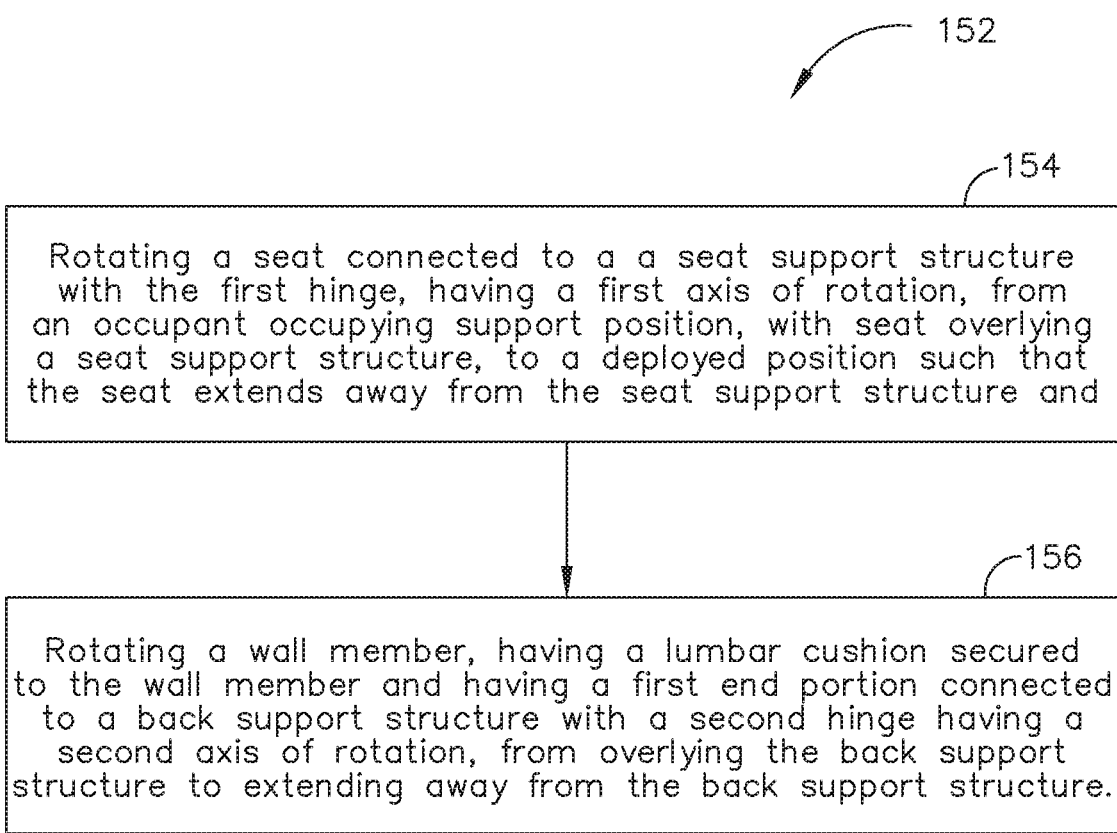
FIG. 16 is a flow chart of a method for transforming the fourth example of the transformable seat assembly of FIG. 13.

In referring to FIG. 16, method 152 for transforming fourth example of transformable seat assembly 94 is shown, which includes step 154 of rotating seat 98 connected to seat support structure 12 with first hinge 100, having a first axis of rotation 101, from an occupant support position 87, with seat 98 overlying seat support structure 12, to a deployed position 119, such that seat 98 extends away from seat support structure 12. Method 152 further includes step 156 of rotating wall member 112, having a lumbar cushion 40 secured to wall member 112 and having a first end portion 114 connected to back support structure 14 with second hinge 116 having second axis of rotation 117, from overlying back support structure 14 to lumbar cushion 40 extending away from back support structure 14 as seen in FIG. 15, as seen in FIG. 15.

Step 154 of rotating seat 98 to deployed position 119 positions seat 98 extending away from vertical plane V1 which extends through first axis of rotation 101 and extending away from back support structure 14. In this example, wall member 112 is linked to seat 98 such that with seat 98 in deployed position 119, wall member 112 is positioned spaced apart in upward direction 120 upward from seat support structure 12 and extending away from back support structure 14. Step 156 of rotating wall member 112 includes removing wall member 112 from blocking relationship with opening 151 defined by back support structure 14, as seen for example in FIG. 19 wherein first support structure 95 is spaced apart from second support structure 97 of back support structure defines opening 151. Opening 151 provides access from back side BS of back support structure 14 to front side FS of back support structure 14 and to support structure 150 of seat support structure 12 as seen for example in FIG. 19. As mentioned earlier, with occupant of seat assembly 96 positioned behind and adjacent to unoccupied fourth example of transformable seat assembly 94, occupant can access support structure 150 through opening 151 so as to utilize space of unoccupied fourth example of transformable seat assembly 94 to extend occupant's legs and rest them upon support structure 150 enhancing comfort to occupant of seat assembly 96.

While various embodiments have been described above, this disclosure is not intended to be limited thereto. Variations can be made to the disclosed embodiments that are still within the scope of the appended claims.

What is claimed:

1. A transformable seat assembly, comprising:
   a seat support structure;
   a back support structure is connected to the seat support structure with a hinge which defines an axis of rotation;
   an actuator assembly comprising a cylinder and a piston positioned within the cylinder, wherein:
     the cylinder is secured to one of the back support structure or the seat support structure;
     the piston is secured to the other of the one of the back support structure or the seat support structure; and
   a blocking member positioned within and adjustable along the cylinder wherein:

with the blocking member in a first position, the piston has a piston head permitted to travel between abutting the blocking member in a first limit position limiting linear travel of the piston in a first direction and an end of the cylinder spaced apart in an opposing second direction from the blocking member, such that with the piston head traveling to the end of the cylinder, rotational travel of the back support structure about the axis of rotation is limited from rotating the back support structure beyond a first reclined position; and with the blocking member in a second position, the blocking member permits linear travel of the piston in the first direction beyond the first limit position such that rotational travel of the back support structure rotates about the axis of rotation into an overlying position relative to the seat support structure.

2. The transformable seat assembly of claim 1, further includes a seat cushion in an overlying position to the seat support structure.

3. The transformable seat assembly of claim 1, further includes a back cushion and a lumbar cushion in an overlying position relative to the back support structure.

4. The transformable seat assembly of claim 3, wherein the lumbar cushion is releasably secured to at least one of the back cushion or the back support structure.

5. The transformable seat assembly of claim 4, with the lumbar cushion removed from the overlying position with respect to the back support structure and the back support structure is rotated about the axis of rotation and positioned in overlying relationship with respect to the seat support structure, the back cushion is positioned in contact with a seat cushion.

6. The transformable seat assembly of claim 1 wherein:
the cylinder is pivotally secured to one of the back support structure or the seat support structure; and
the piston is pivotally secured to one of the other of the back support structure or the seat support structure.

7. The transformable seat assembly of claim 1, the blocking member further includes:
an opening defined by the blocking member which extends along a length of and through the blocking member; and
a plurality of threads defined by the blocking member are positioned along a surface of the opening within the blocking member.

8. The transformable seat assembly of claim 7, further includes a threaded shaft, associated with the plurality of threads defined by the blocking member, wherein the threaded shaft defines a plurality of threads compatible with the plurality of threads defined by the blocking member.

9. The transformable seat assembly of claim 8, wherein a first portion of the threaded shaft engages the plurality of threads defined by the blocking member.

10. The transformable seat assembly of claim 9, further includes a second end portion of the threaded shaft is connected to a motor which imparts rotation to the threaded shaft resulting in linear movement of the blocking member along the threaded shaft and along the cylinder.

11. The transformable seat assembly of claim 10, wherein with rotation of the threaded shaft by the motor in a first rotational direction, the blocking member moves from the first position toward the second position.

12. The transformable seat assembly of claim 11, wherein with the piston head abutting the blocking member and the blocking member moving toward the second position, the threaded shaft extends through and beyond the opening in the blocking member and into an opening defined by the piston, which extends within and along a length of the piston.

13. The transformable seat assembly of claim 10, wherein with the blocking member in the second position, rotation of the threaded shaft by the motor in a second rotational direction moves the blocking member along the threaded shaft and toward the first position.

14. The transformable seat assembly of claim 13, with the blocking member in the first position with the piston head in abutting relationship to the blocking member, the back support structure is positioned in an upright position.

15. A method for transforming a transformable seat assembly, comprising steps of:
moving a blocking member from a first position to a second position with the blocking member positioned within a cylinder of an actuator assembly, which comprises the cylinder and a piston having a piston head positioned within the cylinder, wherein:
the transformable seat assembly comprises a seat support structure connected to a back support structure with a hinge, which defines an axis of rotation;
the cylinder is secured to one of the back support structure or the seat support structure;
the piston is secured to the other of the one of the back support structure or the seat support structure; and
with the blocking member in the first position, the piston head is permitted to travel between, abutting the blocking member in a first limit position limiting linear travel of the piston in a first direction and an end of the cylinder positioned spaced apart in an opposing second direction from the blocking member, such that with the piston traveling to the end of the cylinder, rotational travel of the back support about the axis of rotation is limited from rotating the back support structure beyond a first reclined position; and
rotating the back support structure about the axis of rotation into an overlying position relative to the seat support structure with the blocking member in the second position permitting linear travel of the piston in the first direction beyond the first limit position.

16. The method of claim 15, wherein:
the transformable seat assembly further includes a seat cushion positioned in overlying relationship to the seat support structure;
a back cushion and a lumbar cushion positioned in overlying relationship to the back support structure; and
the lumbar cushion is releasably secured to the back support structure.

17. The method of claim 16, further includes removing the lumbar cushion from the back support structure.

18. The method of claim 15, wherein with the cylinder pivotally secured to one of the back support structure or the seat support structure and the piston pivotally secured to the other of the one of the back support structure or the seat support structure, rotating the back support structure about the axis of rotation includes the cylinder pivotally rotating relative to the one of the back support structure or the seat support structure and includes the piston pivotally rotating relative to other of the one of the back support structure or the seat support structure.

19. The method of claim 15, wherein moving the blocking member positioned within the cylinder further includes:
activating a motor to rotate a threaded shaft, wherein:

an opening defined by the blocking member extends along a length of and through the blocking member;

a plurality of threads defined by the blocking member are positioned along a surface of the opening within the blocking member;

the threaded shaft, associated with the threads defined by the blocking member, defines a plurality of threads compatible with the plurality of threads defined by the blocking member;

the plurality of threads of a first end portion of the threaded shaft engage the plurality of threads defined by the blocking member and a second end portion of the threaded shaft is connected to a motor which imparts rotation to the threaded shaft resulting in linear movement of the blocking member along the threaded shaft and along the cylinder;

with rotating of the threaded shaft by the motor in a first rotational direction, the blocking member moves from the first position to the second position; and with the piston head abutting the blocking member and the blocking member moving toward the second position, the threaded shaft extends through and beyond the opening in the blocking member and into an opening which extends within and along a length of the piston.

20. The method of claim 19, with the blocking member in the second position, rotating of the threaded shaft by the motor in a second rotational direction moves the blocking member along the threaded shaft and toward the first position such that with the blocking member in the first position and the piston head abuts the blocking member, the back support structure is positioned in an upright position.

* * * * *